United States Patent
Freda et al.

(10) Patent No.: US 12,207,288 B2
(45) Date of Patent: *Jan. 21, 2025

(54) METHODS FOR EFFICIENT RESOURCE USAGE BETWEEN COOPERATIVE VEHICLES

(71) Applicant: INTERDIGITAL PATENT HOLDINGS, INC., Wilmington, DE (US)

(72) Inventors: Martino M. Freda, Laval (CA); Tao Deng, Roslyn, NY (US); Tuong Duc Hoang, Montreal (CA); Benoit Pelletier, Roxboro (CA); Aata El Hamss, Laval (CA); Saad Ahmad, Montreal (CA); Michelle Perras, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/978,668

(22) Filed: Nov. 1, 2022

(65) Prior Publication Data
US 2023/0118609 A1    Apr. 20, 2023

Related U.S. Application Data

(63) Continuation of application No. 17/044,666, filed as application No. PCT/US2019/025127 on Apr. 1, 2019, now Pat. No. 11,528,716.
(Continued)

(51) Int. Cl.
*H04W 72/543* (2023.01)
*H04W 4/40* (2018.01)
(Continued)

(52) U.S. Cl.
CPC .......... *H04W 72/543* (2023.01); *H04W 4/40* (2018.02); *H04W 28/0252* (2013.01); *H04W 28/0268* (2013.01); *H04W 72/56* (2023.01)

(58) Field of Classification Search
CPC .............. H04W 4/40; H04W 28/0252; H04W 28/0268; H04W 28/26; H04W 72/0406;
(Continued)

(56) References Cited

U.S. PATENT DOCUMENTS 9,107,026 B1 * 8/2015 Viswanadham ...... H04W 8/005
9,204,473 B2  12/2015 Wang et al.
(Continued)

FOREIGN PATENT DOCUMENTS

EP    3 148 285     4/2019
JP    2017-200204   11/2017
(Continued)

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
(Continued)

*Primary Examiner* — Khoa Huynh
(74) *Attorney, Agent, or Firm* — Volpe Koenig

(57) ABSTRACT

Methods, systems, and apparatuses for sidelink communication are disclosed. A WTRU may receive a first SCI element from a second WTRU within a group. The WTRU may receive a first RCI element within a first set of resources scheduled by the first SCI. The first RCI may include information about which WTRU in the group is scheduled to use a second set of resources. The WTRU may determine, based on the first RCI, that one or more subresources within
(Continued)

the second set of resources are available. The WTRU may transmit data in the one or more subresources. The first SCI and the first RCI may be received in a first reservation period and the one or more subresources may be in a second reservation period.

18 Claims, 8 Drawing Sheets

Related U.S. Application Data

(60) Provisional application No. 62/651,974, filed on Apr. 3, 2018, provisional application No. 62/668,322, filed on May 8, 2018, provisional application No. 62/735,982, filed on Sep. 25, 2018.

(51) Int. Cl.
  *H04W 28/02* (2009.01)
  *H04W 72/56* (2023.01)
(58) Field of Classification Search
  CPC . H04W 72/087; H04W 72/10; H04W 72/121; H04W 72/1278; H04W 72/543; H04W 72/56; H04W 92/18
  See application file for complete search history.

(56) References Cited

U.S. PATENT DOCUMENTS

| | | | |
|---|---|---|---|
| 10,631,223 | B2 | 4/2020 | Adachi |
| 11,122,537 | B2 | 9/2021 | Shin et al. |
| 2005/0169257 | A1 | 8/2005 | Lahetkangas et al. |
| 2012/0099477 | A1 | 4/2012 | Buckl et al. |
| 2014/0302791 | A1 | 10/2014 | Mok et al. |
| 2015/0156662 | A1 | 6/2015 | Bai et al. |
| 2016/0295624 | A1 | 10/2016 | Novlan et al. |
| 2016/0323869 | A1 | 11/2016 | Xu et al. |
| 2017/0181206 | A1 | 6/2017 | Lee et al. |
| 2017/0289733 | A1 | 10/2017 | Rajagopal et al. |
| 2018/0132278 | A1 | 5/2018 | Oteri et al. |
| 2018/0160301 | A1* | 6/2018 | Kwon ............ H04W 4/06 |
| 2018/0279229 | A1 | 9/2018 | Dinan et al. |
| 2018/0337846 | A1* | 11/2018 | Lee ............ H04W 28/082 |
| 2019/0141694 | A1* | 5/2019 | Gupta ............ H04L 25/0224 |

FOREIGN PATENT DOCUMENTS

| | | |
|---|---|---|
| WO | 2016/163972 | 10/2016 |
| WO | 2016/165124 | 10/2016 |
| WO | 2017/051330 | 3/2017 |
| WO | 2017/194212 | 11/2017 |
| WO | 2018/016157 | 1/2018 |
| WO | 2018/027528 | 2/2018 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
EEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).
Interdigital Communications, "SCI contents for R14 V2V," 3GPP TSG-RAN WG1 Meeting #86, R1-167590, Gothenburg, Sweden (Aug. 22-26, 2016).
Interdigital Inc., "NR Sidelink Physical Layer Structures and Procedures," 3GPP TSG RAN WG1 Meeting #94, R1-1809094, Gothenburg, Sweden (Aug. 20-24, 2018).
Interdigital Inc., "QoS Management for NR V2X," 3GPP RAN WG1 Meeting #94, R1-1808600, Gothenburg, Sweden (Aug. 20-24, 2018).
Interdigital Inc., "QoS Management for NR V2X," 3GPP RAN WG2 Meeting #103bis, R2-1814018, Chengdu, China (Oct. 8-12, 2018).
Interdigital Inc., "QoS Management for NR V2X," 3GPP RAN WG2 Meeting #104, R2-1816790, Spokane, USA (Oct. 12-16, 2018).
Interdigital Inc., "QoS Management for NR V2X," 3GPP RAN WG2 Meeting #105, R2-1901575, Athens, Greece (Feb. 25-Mar. 1, 2019).
Interdigital Inc., "QoS Management for NR V2X," 3GPP TSG RAN WG1 Meeting #94bis, R1-1811116, Chengdu, China (Oct. 8-12, 2018).
Interdigital Inc., "Resource Allocation for NR V2X," 3GPP RAN WG1 Meeting #95, R1-1813164, Spokane, USA (Oct. 12-16, 2018).
Interdigital Inc., "Resource Allocation for NR V2X," 3GPP TSG RAN WG1 Meeting #94b, R1-1811115, Chengdu, China (Oct. 8-12, 2018).
Interdigital Inc., "Resource Allocation in Support of Unicast and Groupcast," 3GPP RAN WG2 Meeting #104, R2-1816789, Spokane, USA (Oct. 12-16, 2018).
Interdigital Inc., "Vehicle platooning use case in NR V2X," 3GPP RAN WG1 Meeting #94, R1-1808601, Gothenburg, Sweden (Aug. 20-24, 2018).
Interdigital, "Resource Allocation in Support of Unicast and Groupcast," 3GPP RAN WG2 Meeting #103bis, R2-1814017, Chengdu, China (Oct. 8-12, 2018).
Third Generation Partnership Project, "Technical Specification Group Services and System Aspects; Architecture enhancements for 5G System (5GS) to support Vehicle-to-Everything (V2X) services (Release 16)," 3GPP TS 23.287 V0.2.0 (Mar. 2019).
Third Generation Partnership Project, "Technical Specification Group Radio Access Network; Evolved Universal Terrestrial Radio Access (E-UTRA); Physical layer procedures (Release 14)," 3GPP TS 36.213 V14.4.0 (Sep. 2017).
Third Generation Partnership Project, "Technical Specification Group Radio Access Network; Evolved Universal Terrestrial Radio Access (E-UTRA); Physical layer procedures (Release 15)," 3GPP TS 36.213 V15.1.0 (Mar. 2018).
Third Generation Partnership Project, "Technical Specification Group Radio Access Network NR Radio Resource Control (RRC) protocol specification (Release 15)," 3GPP TS 38.331 V15.0.0 (Dec. 2017).
Third Generation Partnership Project, "Technical Specification Group Radio Access Network NR Radio Resource Control (RRC) protocol specification (Release 15)," 3GPP TS 38.331 V15.4.0 (Dec. 2018).
Third Generation Partnership Project, "Technical Specification Group Radio Access Network; NR; Physical layer procedures for control (Release 15)," 3GPP TS 38.213 V15.0.0 (Dec. 2017).
Third Generation Partnership Project, "Technical Specification Group Radio Access Network; NR; Medium Access Control (MAC) protocol specification (Release 15)," 3GPP TS 38.321 V15.4.0 (Dec. 2018).

(56) References Cited

OTHER PUBLICATIONS

Third Generation Partnership Project, "Technical Specification Group Radio Access Network; Evolved Universal Terrestrial Radio Access (E-UTRA); Physical layer procedures (Release 15)," 3GPP TS 36.213 V15.5.0 (Mar. 2019).

Third Generation Partnership Project, "Technical Specification Group Services and System Aspects; Enhancement of 3GPP support for V2X scenarios; Stage 1 (Release 16)," 3GPP TS 22.186 V16.1.0 (Dec. 2018).

Third Generation Partnership Project, "Technical Specification Group Services and System Aspects; Enhancement of 3GPP support for V2X scenarios; Stage 1 (Release 15)," 3GPP TS 22.186 V15.2.0 (Sep. 2017).

Third Generation Partnership Project, "Technical Specification Group Services and System Aspects; Enhancement of 3GPP support for V2X scenarios; Stage 1 (Release 15)," 3GPP TS 22.186 V15.4.0 (Sep. 2018).

Third Generation Partnership Project, "Technical Specification Group Radio Access Network; E-UTRA and NR; Service Data Adaptation Protocol (SDAP) specification (Release 15)," 3GPP TS 37.324 V1.2.0 (Mar. 2018).

Third Generation Partnership Project, "Technical Specification Group Radio Access Network; E-UTRA and NR; Service Data Adaptation Protocol (SDAP) specification (Release 15)," 3GPP TS 37.324 V15.1.0 (Sep. 2018).

Third Generation Partnership Project, "Technical Specification Group Radio Access Network; NR; Physical layer procedures for control (Release 15)," 3GPP TS 38.213 V15.5.0 (Mar. 2019).

Third Generation Partnership Project, "Technical Specification Group Radio Access Network; NR; Medium Access Control (MAC) protocol specification (Release 15)," 3GPP TS 38.321 V15.1.0 (Mar. 2018).

Third Generation Partnership Project, "Technical Specification Group Services and System Aspects; Study on enhancement of 3GPP Support for 5G V2X Services (Release 16)," 3GPP TR 22.886 V16.2.0 (Dec. 2018).

Third Generation Partnership Project, "Technical Specification Group Services and System Aspects; Study on enhancement of 3GPP Support for 5G V2X Services (Release 15)," 3GPP TR 22.886 V15.1.0 (Mar. 2017).

Third Generation Partnership Project, "Technical Specification Group Services and System Aspects; Study on enhancement of 3GPP Support for 5G V2X Services (Release 15)," 3GPP TR 22.886 V15.3.0 (Sep. 2018).

Third Generation Partnership Project, "Technical Specification Group Radio Access Network; Study on LTE-based V2X Services; (Release 14)," 3GPP TR 36.885 V14.0.0 (Jun. 2016).

Xinwei, "QoS control in sidelink communications," 3GPP TSG RAN WG2 Meeting #91, R2-153575, Beijing, China (Aug. 24-28, 2015).

Ericsson, "Congestion Control in V2X Sidelink," 3GPP TSG-RAN WG2 #94, R2-164106, Nanjing, China (May 23-27, 2016).

Huawei et al., "Congestion Control for PC5-based V2X," 3GPP TSG-RAN WG2 Meeting #96, R2-167935, Reno, USA (Nov. 14-18, 2016).

* cited by examiner

METHODS FOR EFFICIENT RESOURCE USAGE BETWEEN COOPERATIVE VEHICLES

CROSS-REFERENCE TO RELATED APPLICATIONS

This application is a continuation of U.S. patent application Ser. No. 17/044,666 filed Oct. 1, 2020, which is the U.S. National Stage, under 35 U.S.C. § 371, of International Application No. PCT/US2019/025127 filed Apr. 1, 2019, which claims the benefit of U.S. Provisional Application No. 62/651,974 filed Apr. 3, 2018, U.S. Provisional Application No. 62/668,322 filed May 8, 2018, and U.S. Provisional Application No. 62/735,982 filed Sep. 25, 2018, the contents of which are incorporated herein by reference.

BACKGROUND

Vehicular ("V2X") communication is a mode of communication in which wireless transmit/receive units (WTRUs) may communicate with each other directly. While in coverage, WTRUs may receive assistance from a network to start transmitting and receiving V2X messages. While out of coverage, WTRUs may use one or more pre-configured parameters to start transmitting and receiving V2X messages.

SUMMARY

Methods, systems, and apparatuses for sidelink communication are disclosed. A WTRU may receive a first SCI element from a second WTRU within a group. The WTRU may receive a first RCI element within a first set of resources scheduled by the first SCI. The first RCI may include information about which WTRU in the group is scheduled to use a second set of resources. The WTRU may determine, based on the first RCI, that one or more subresources within the second set of resources are available. The WTRU may transmit data in the one or more subresources. The first SCI and the first RCI may be received in a first reservation period and the one or more subresources may be in a second reservation period.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
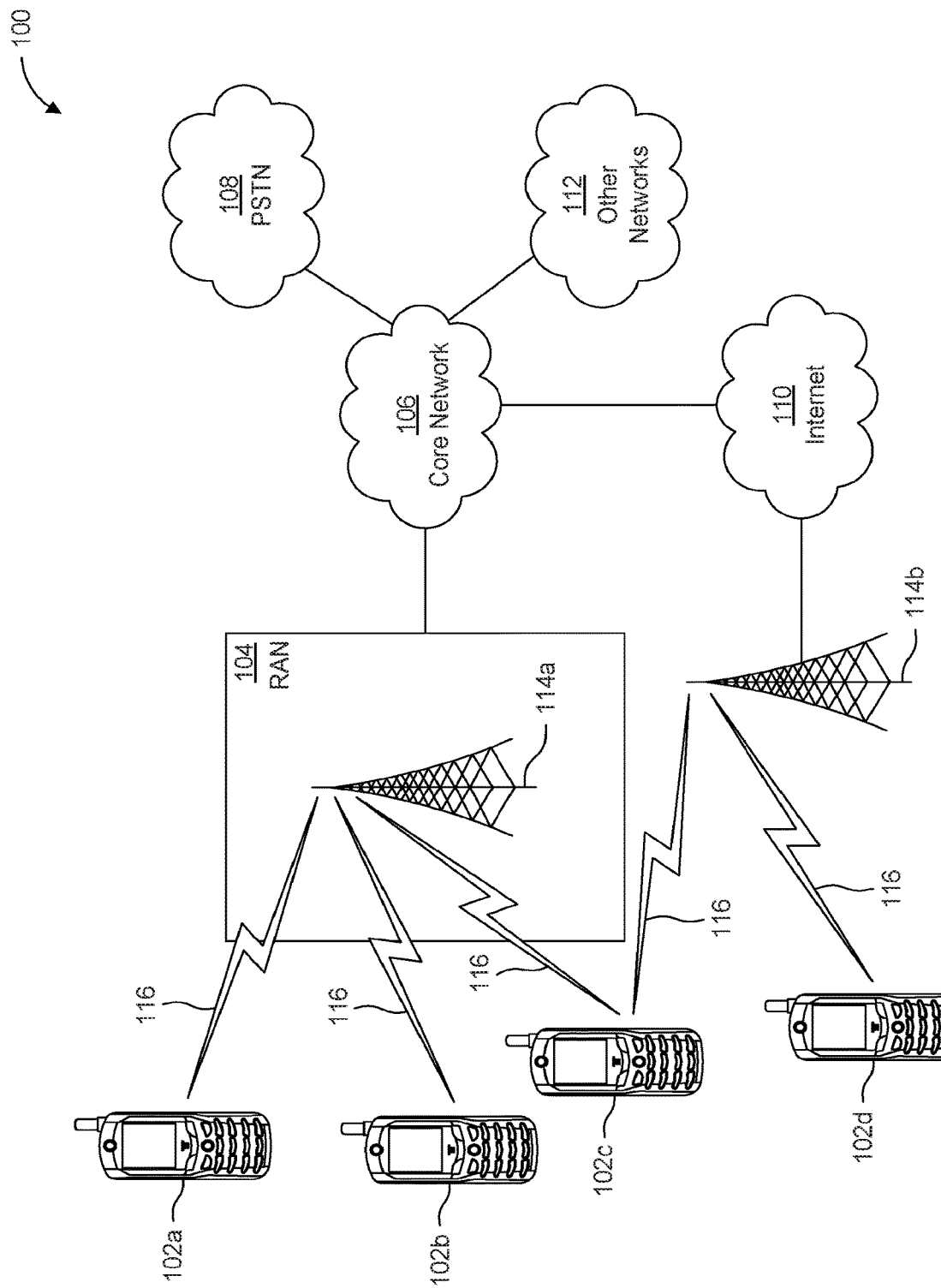
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
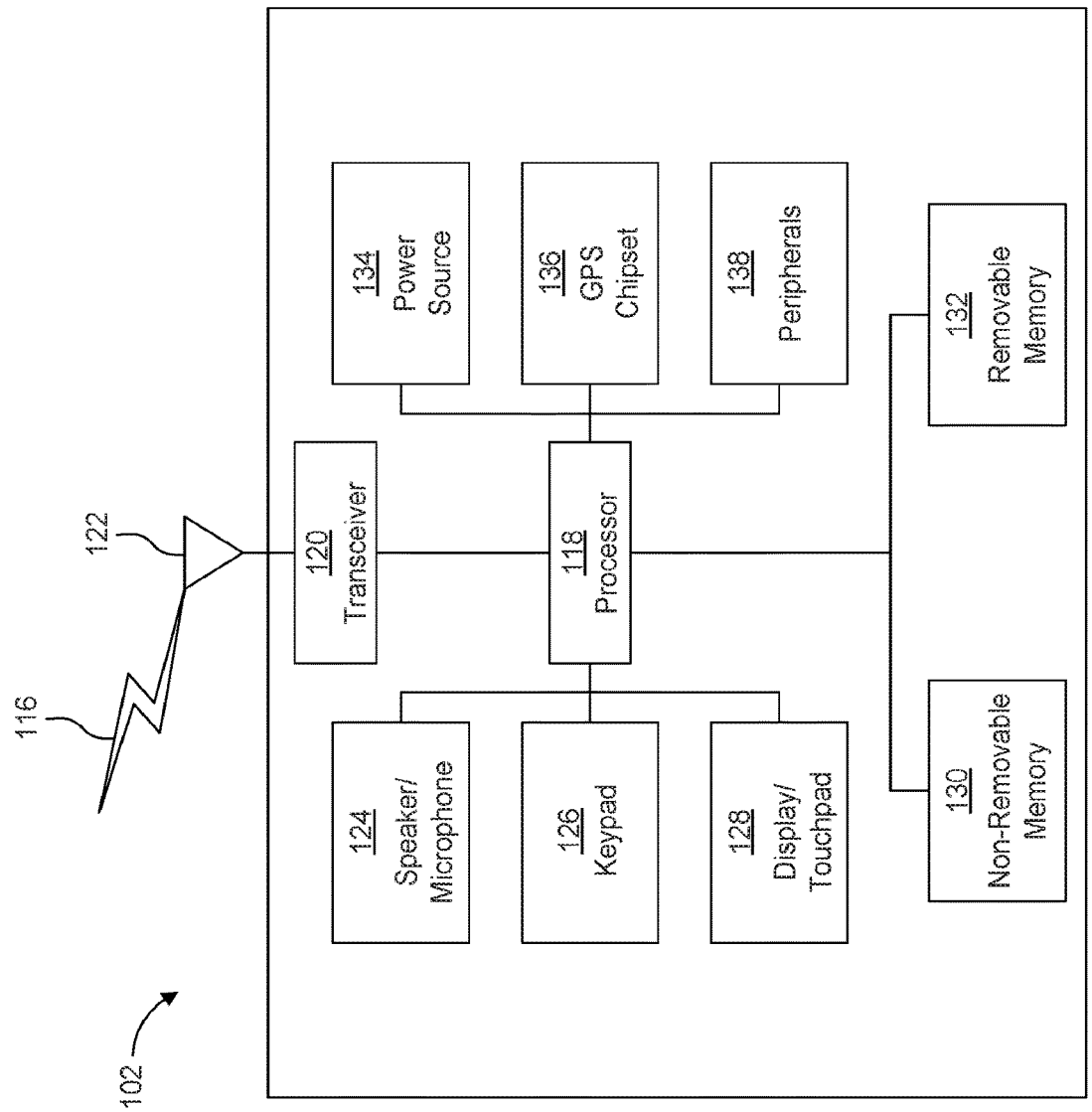
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
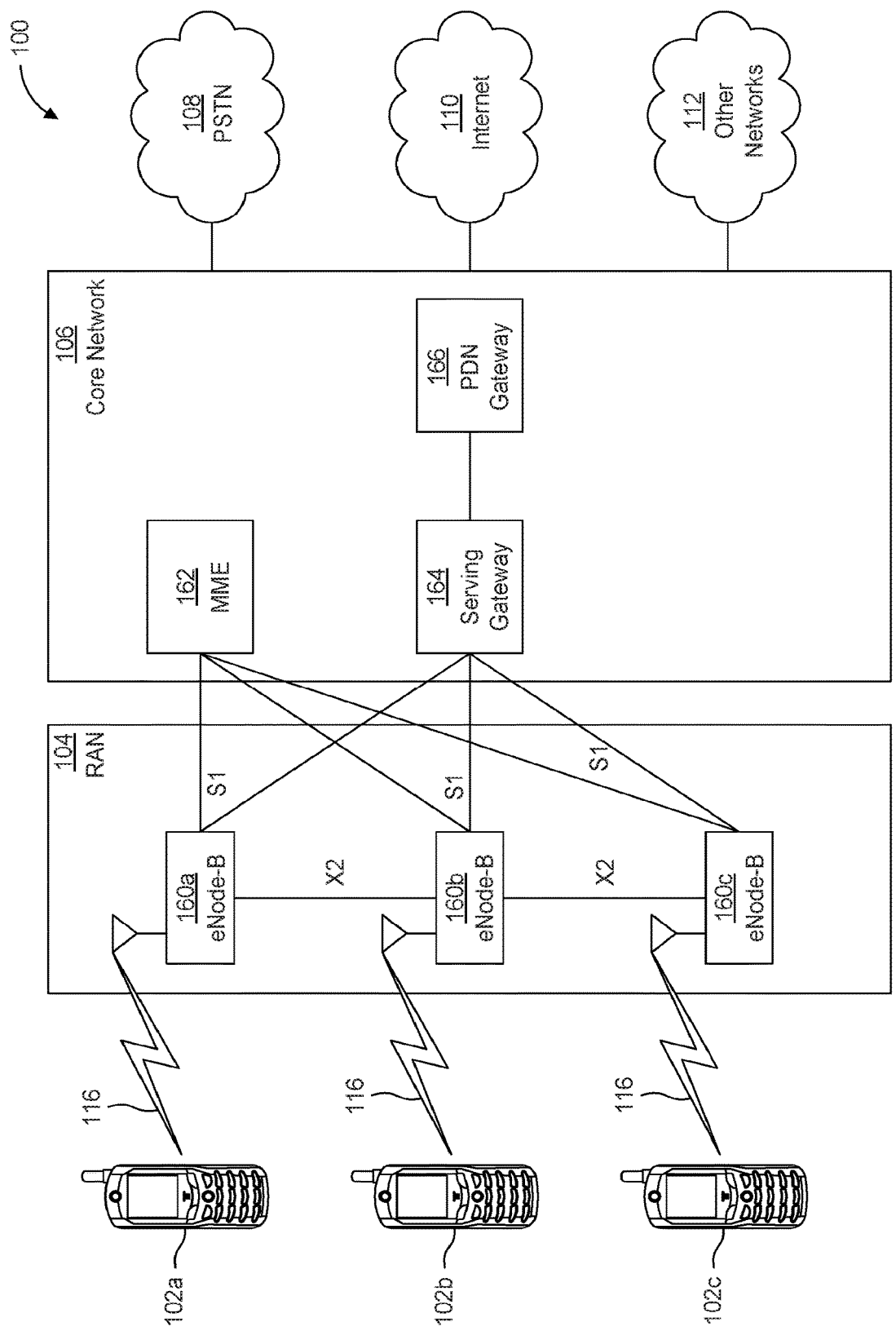
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11 ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
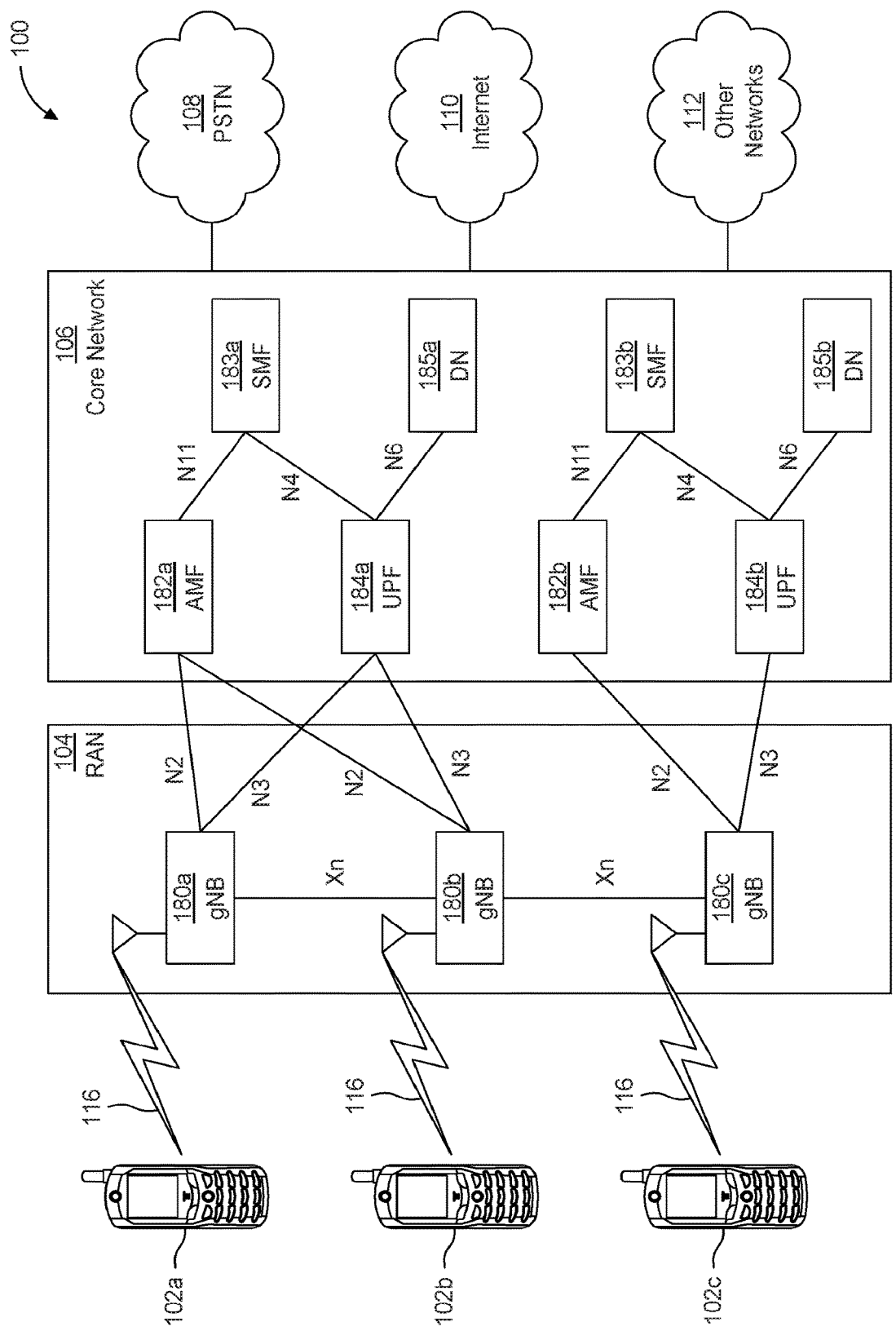
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

As described above, vehicular ("V2X") communication is a mode of communication in which WTRUs may communicate with each other directly. V2X communication is supported in Release 14 Long Term Evolution ("LTE") communications, and was inspired from previous work on Device-to-Device (D2D) communications. V2X communication services may include one or more of the following types. Vehicle to vehicle ("V2V") communication may allow vehicular WTRUs to communicate with each other directly. Vehicle to infrastructure ("V2I") communication may allow vehicular WTRUs to communicate with roadside units (RSUs) and/or gNBs. Vehicle to network ("V2N") communication may allow vehicular WTRUs to communicate with a core network. Vehicle to pedestrian ("V2P") communication may allow vehicular WTRUs to communicate with other types of WTRUs, such as those with special conditions such as low battery capacity.

LTE defines two modes of operation for V2X communication. In Mode 3, the network may give the WTRU a scheduling assignment for V2X sidelink transmission. In Mode 4, the WTRU may autonomously select resources from a configured/pre-configured resource pool. Furthermore, LTE defines two categories of resource pools for V2X communication, receiving pools and transmitting pools. The receiving pools are monitored for receiving V2X transmissions. The transmitting pools are used by WTRUs to select the transmission resources in Mode 4. Transmitting pools are not used by WTRUs configured in Mode 3.

The resource pools may be semi-statically signaled to WTRUs via RRC signaling. In Mode 4, the WTRU may use sensing before selecting a resource from the RRC configured transmitting pool. LTE V2X may not support dynamic resource pools reconfiguration. Pool configuration may only be carried via a system information block (SIB) and/or dedicated RRC signaling.

The next generation of wireless systems, referred to as New Radio ("NR") systems, are currently being developed. NR systems are expected to support a number of use cases such as enhanced mobile broadband ("eMBB"), ultra-high reliability and low latency communications ("URLLC"), and enhanced V2X communication. V2X communication in NR is expected to support new services for both safety and non-safety scenarios (e.g., sensor sharing, automated driving, vehicle platooning, and remote driving).

Vehicle Platooning may enable vehicles to dynamically form a group while travelling together. Vehicles in the platoon may receive periodic data from a lead vehicle in order to carry on platoon operations. This information may allow the distance between vehicles to become extremely small. For example, the gap distance translated to time may be very low (e.g. sub second). Platooning applications may allow the vehicles following the lead vehicle to be autonomously driven.

Advanced driving may enable semi-automated or fully-automated driving. Longer inter-vehicle distance may be assumed. A vehicle and/or RSU may share data obtained from its local sensors with vehicles in proximity. This may allow vehicles to coordinate their trajectories or maneuvers. In addition, a vehicle may share its driving intention with vehicles in proximity. This may allow safer traveling, collision avoidance, and improved traffic efficiency.

Extended sensors may enable the exchange of raw or processed data gathered through one or more of local sensors or live video data among vehicles, RSUs, pedestrian devices, and V2X application servers. The vehicles may enhance the perception of their environment beyond what their own sensors can detect and may have a more holistic view of the local situation.

Remote driving may enable a remote driver or a V2X application to operate a remote vehicle for passengers who cannot drive themselves or a remote vehicle located in dangerous environments. For a case where variation is limited and routes are predictable, such as public transportation, driving based on cloud computing may be used. In addition, access to cloud-based back-end service platform may be used. It should be noted that different V2X services may require different performance requirements, and for some scenarios, 3 ms latency may be required.

In vehicle platooning, certain messages may need to be transmitted to the entire platoon of vehicles and other messages may need to be transmitted to only one vehicle in particular. Many messages may be transmitted between WTRUs in the same platoon (for example, using unicast transmission). It may be inefficient to allocating allocated a unique L2 identification (ID) for each combination of WTRUs that can communicate with each other as is done in conventional D2D communication.

Transmission resources used by vehicles within a platoon may have deterministic timing relationship. This timing relationship may be required to address certain requirements for vehicle platooning. For example, the very short latency between transmissions of successive WTRUs in a platoon require resources available for each WTRU to have a short timing offset. Methods to ensure resource coordination and management may be required at the access spectrum (AS) layer since independent resource reservations by each WTRU may not be feasible and/or may be inefficient.

In addition, SA1 requirements indicate that the AS may need to control the communication range for a message based on message characteristics. Methods may be required for the WTRU to distinguish the required transmission range based on characteristics of the message and be able to use sidelink transmission resources efficiently.

The platoon is a V2X application layer concept that manifests itself at the access stratum as a group of WTRUs. The WTRUs may be related to one another in terms of geographical location, resource usage, sensing, and/or addressing. The description herein may include the general notion of a WTRU group, which could be formed from a platooning application or from other V2X applications. The WTRU group in this context may have one or more of the following characteristics. WTRUs may move together or have related geolocation and/or topology. WTRUs may need to communicate in multicast with an entire group. WTRUs may need to communicate in unicast to specific members of the group.

In one example, group members may be determined through application layer management/signaling. Group formation and modification decisions may be made by an associated V2X application (e.g., a platoon application). Group information may be made fully available to the AS. For instance, a list of WTRUs that are part of the group may be communicated periodically to the AS.

In another example, group determination and/or modification may be determined by the application layer and known only to the application layer. The AS layer may receive specific information that ensures WTRU behavior, relative to addressing and resource usage, reflects the presence and topology of the group. The application layer may indicate that a WTRU should take on specific AS behavior when that WTRU has been made the group leader at the application layer.

A WTRU may receive the following information from the application layer. With each application layer packet, the WTRU may receive one or more of an indication of whether the packet should be transmitted in multicast or unicast, range information, timing requirements, and an indication of whether a packet needs to be relayed throughout the group. Periodically, or upon specific triggers from the application layer, the WTRU may receive one or more of an indication that the WTRU is part of or no longer part of a group of WTRUs at the AS and the associated group ID, and indication that the WTRU should start or stop performing certain group lead AS behavior, and indication of the addition/or removal of another WTRU from a group and its associated ID, a WTRU's member ID, and proximity information of different WTRUs in a group (e.g., orientation, distance, etc.).

A WTRU may further apply certain behavior associated only with data packets, services, and/or control information associated with group communication. More specifically, the information above may be associated with only a set of services, possibly identified by a service ID, destination ID, or other identifier provided by the application layer.

Conventional methods of V2X communication may not have procedures for unicast addressing. Some types of D2D communication allow for unicast and multicast addressing. For unicast addressing in D2D, a WTRU's ProSe WTRU ID may be used as the L2 Destination ID in place of the ProSe L2 Group ID. While this may enable transmission of unicast messages within a group, this approach may have the following issues. The application layer may need to reserve unique identifiers for services which are different than any WTRU's ProSe WTRU ID. In addition, given a possible large address space, the entire address may need to be included in the header of any packet transmitted by the MAC layer. Also, group identification in D2D and conventional V2X may only refer to a service, without specifically implying any physical relationship between the destination WTRUs. As a result, the AS may not know whether a transmission is related to a service (e.g., a conventional concept of grouping) or a physical grouping of WTRUs to enable platooning.

It should be noted that the term "group communication" may refer to communication within a group of physically related WTRUs (e.g., a platoon) and not in the context of conventional group communication. Without loss of generality, a group communication may refer to communication between two WTRUs (unicast) or multiple WTRUs (multicast). A group destination address may be used as the destination address for unicast or multicast communication.

A WTRU may be provided with and use (e.g., in the MAC header) a different destination address structure depending on one or more of the following: whether or not an application layer packet is associated with communication for a specific group (e.g., physical grouping), whether the transmission is a unicast transmission within that physical grouping, and whether the transmission is multicast to the entire group in the physical grouping. More specifically, a destination address may have the following structure: service ID+ group ID+member ID. The group ID and member ID may be optional and used only in the case of group communication. The WTRU may transmit a MAC header with a variable header size based on the received destination address from the application layer. The WTRU may further indicate a header type to distinguish each of the transmission cases. The service ID may be omitted by the MAC layer in the case of group communication. The service ID may be transmitted within the application layer information.

A WTRU may perform different behaviors relative to multiplexing and resource selection depending on the destination address received from the application layer for transmission over sidelink. The WTRU may allow multiplexing of AS group control information, such as resource coordination information ("RCI"), with packets having a destination address that contains a group ID and no member ID. The WTRU may perform group-based resource selection for a group of communicating WTRUs when the packets have a destination address that contains at least a group ID. The WTRU may rely on group-based resources reserved by another WTRU associated with the same group when the packet has a destination address that contains at least a group ID. The WTRU may transmit a reservation signal for group-based resources indicated in the group ID when the packet has a destination address that contains at least a group ID.

Sidelink resources may be reserved for group communications. A Sidelink Control Information ("SCI") may indicate that a transmission is associated with a specific group (e.g., by inclusion of a group identifier in the SCI). In this case, a WTRU may include only a member ID in the MAC layer header for transmissions associated with these dedicated resources or transmission scheduled by the SCI. For a transmission that is broadcast to an entire group, the WTRU may include a special member ID (e.g., all 0s) to distinguish this as a multicast transmission to the entire group. The WTRU may not include a member ID and may use the MAC header type to distinguish this as a multicast transmission to the entire group.

A WTRU may receive a L2 destination address from upper layers to be used for group communication. The WTRU may receive the L2 source IDs of the WTRUs that form the group along with the L2 destination address.

A WTRU may receive a set of unique L2 destination addresses from upper layers for use in group communication. A WTRU may select one of these addresses to be used for group communication that may be formed and/or managed by the WTRU. The WTRU may further inform the upper layers of the L2 source addresses of the WTRUs that form the group and the corresponding L2 destination group address.

A WTRU may inform other WTRUs in a group of the destination address to be used for group communication. A WTRU may initiate group formation signaling between WTRUs (e.g., though RRC messages) whereby the destination address for a group can be exchanged.

A WTRU may use a dedicated destination L2 address for exchanging group formation and/or group maintenance signaling. For example, the destination L2 address may indicate that the message is a control plane message rather than a user plane message. A WTRU that receives a message with a dedicated control plane destination ID may route the message to the RRC entity within the WTRU's protocol stack. A WTRU that transmits an inter-WTRU control plane signaling message (e.g., an RRC message) may utilize the dedicated destination L2 address for control messages. A WTRU may determine the dedicated L2 address for control plane signaling based on preconfiguration. The WTRU may determine this address from the upper layers.

A WTRU that is part of a configured group may utilize a set of resources that are reserved for communication by members of the same group of WTRUs. This may allow for lower-latency and/or higher reliability communication between WTRUs in a group. Interference/contention with WTRUs outside of the group, which may be in proximity to the group, may be avoided. Low latency and/or high reliability may be required for intra-group communication.

A WTRU may be configured with one or more resource pools used for group communication. The WTRU may receive a configuration of one or more group-specific resource pools in a broadcast (SIB), in dedicated signaling, or in preconfiguration. The group-specific resource pool may be determined from this configuration based on one or more of the WTRU's geographical location, WTRU speed, WTRU heading, group ID, member ID, and application layer information (e.g. related to topology).

A resource pool configuration may be associated with a group ID. A WTRU may receive a packet from the upper layers that is intended for transmission to a specific group (i.e., the destination address matches the destination address of the group). The WTRU may select resources from the group-specific pool for transmission. The WTRU may further use resources from the group-specific pool under certain conditions associated with the packet to be transmitted. The conditions may be one or more of the following QoS-related conditions: the packet has certain delay budget that meets a predetermined criteria, the packet needs to be transmitted in unicast or multicast fashion, the packet has a certain required range of transmission or specific directionality for transmission (e.g., as determined by the application), the packet is associated with a certain data rate requirement, and the packet has a certain priority.

A WTRU may be configured with group specific pool for reception, which may be derived in a similar manner. A WTRU may monitor resources from the group specific pool when any of the conditions above are satisfied.

A WTRU may receive a group-specific resource pool configuration in the RRC configuration. The group-specific resource pool configuration may indicate the use of one or more resource pools depending on the WTRU's geolocation and the group ID. The WTRU may select a group-specific resource pool from the set of pools in the configuration based on its geolocation and group ID. The WTRU may select the resource pool using a modulo operation on its latitude/longitude and group ID. More specifically, the pool configuration may consist of a table of M×N resource pools and the WTRU may determine the index of the resource pool in the table to use at any time by the following equations:

$$m = (\text{lat/long}) \bmod M \qquad \text{Equation 1}$$

$$n = (\text{group ID}) \bmod N. \qquad \text{Equation 2}$$

The WTRU may use the group-specific resource pool whenever the WTRU is assigned to a group and has transmissions for that group. Otherwise, the WTRU may use other TX pools. A WTRU may receive a message from the application layer that it has been assigned to a specific group. The message may contain an associated group identifier. Following such assignment, the WTRU may choose resources from the group specific pool when it receives a packet from the upper layers for transmission. The packet may be tagged by the same group identifier. The WTRU may further select resources from the group specific resource pool which depend on a member ID within the group.

A WTRU in a group may transmit a group reservation signal on the sidelink channel to reserve resources usable by a number of WTRUs that are part of the group. The WTRU may be further configured to transmit the reservation signal along with its own sidelink data transmissions. The reservation signal may be further transmitted along with sidelink data transmissions that are intended for the same group for which the reservation signal is being transmitted. For example, a WTRU may transmit an SCI which serves as a reservation signal for resources that can be used by a group. The SCI may include the group identifier, or a portion of the group identifier. The WTRU may further schedule data on the PSSCH that the WTRU is transmitting using the same SCI. The data may have one or more members of the group as intended destination.

The group reservation signal may be a field in an existing V2X transmission on PSCCH or PSSCH, a new message transmitted on either of these channels, or a combination of both. More specifically, the reservation signal may be transmitted in one or more of the following ways: a field in the sidelink scheduling assignment, SCI, or similar message on PSCCH; a synchronization signal, or field transmitted within a synchronization signal, similar to PSBCH; and a message (e.g., MAC CE, RRC, or application layer message) contained on the PSSCH. This message may further be transmitted within the resources which the group reservation signal is intending to reserve.

The reservation signal may provide one or more of the following pieces of information. The reservation signal may provide a group indication or group identification to specify the particular group of WTRUs for which the resource is reserved. The reservation signal may provide an indication of the resources being reserved, such as the time, frequency, beam, or set of beams. This indication may be implicitly included in the scheduling information provided by the scheduling message. For example, the reservation signal may reserve the resources that the SCI is intending to schedule. In addition, this indication may further consist of additional information for the reservation which is not included in the scheduling information. For example, the reservation signal may indicate the reservation of the scheduled resources for a number of subframes, time periods, or it may indicate the subset of the scheduled resources. The reservation signal may provide resource coordination information (RCI) for coordination of the resources between multiple WTRUs. The reservation signal may provide geo-location of the WTRU transmitting the resource reservation signal.

RCI for a specific group or group-reserved resources may be transmitted in sidelink by one or a number of WTRUs (e.g. group leader), relayed by a WTRU, or transmitted by all WTRUs. A WTRU may further be configured by upper layers to transmit and/or relay RCI. RCI may be transmitted as part of the resource reservation signal. RCI may be transmitted as an access stratum control message, such as a MAC CE or inter-WTRU control message on sidelink. For example, a WTRU configured to transmit RCI may do so periodically, or upon changes in content of RCI (e.g., a change in a set of WTRUs in a group). RCI may be provided to a WTRU by the application layer and changed upon the change of group topology (e.g., a change in the number of vehicles in a platoon or their sequencing).

A specific or designated WTRU may transmit RCI to indicate the sequencing for the usage of the resources reserved for a group in the group reservation signal. A WTRU may transmit RCI to indicate its usage or non-usage of a resource or subresource. For example, a WTRU may indicate to the remainder of the group that it will not use the subsources that were assigned to it by any method described herein. Another WTRU which may be indicated in the RCI or determined by specific rules (e.g., an WTRU with the next largest member ID) may use the subresources of the WTRU that sent the indication.

A WTRU may transmit RCI to indicate sensing results it determines for resources associated with a group. For instance, a WTRU may transmit one or more of the RSRP, RSSI, and occupancy information it detects (e.g., SCI transmissions reserving resources which are not associated with its own group) as part of the SCI.

RCI associated for a specific group may be read only by members of that group. For example, a WTRU may transmit RCI as a MAC CE in a MAC SDU having a destination address that matches the group destination address. While the SCI may reserve the resources for a group and be visible to WTRUs outside the group, the RCI may indicate such resource usage within the group and may be visible only to WTRUs within the group.

RCI may indicate the allowed time/frequency/beam sequencing of a WTRU's own transmission subresources within a set of subresources. This may be in the form of a table, bitmap, or ordering of member IDs. The size of the RCI may be decided, for example, by the application layer based on platoon topology. The size of the table/bitmap may be communicated by the application layer.

RCI may indicate conditions for use of a subresource associated with a WTRU's own transmissions or with transmissions of other WTRUs, such as: minimum priority of data for which a WTRU can utilize its own subresources in a group, and minimum priority of data for which a WTRU can utilize other subresources in a group. These conditions may be preconfigured in the WTRU and not be transmitted with the RCI.

The RCI may indicate rules and/or indications for changing the sequencing of subresource usage. For example, the RCI may contain an indication that a WTRU may use other un-used subresources belonging to other WTRUs. The RCI may indicate rules for whether/when a WTRU can transmit a new RCI. The RCI may indicate a set of resources to be sensed by a specific WTRU in the group. For example, the RCI may contain an indication of which time/frequency/bwp/beam a given WTRU should perform sensing on for monitoring of SCI, and possible reporting in related control information. The RCI may indicate buffer occupancy information, such as the amount of data pending in the WTRU's buffer and potentially associated with transmission for a specific group of WTRUs and/or associated with different QoS requirements. The RCI may indicate a random number associated with the selection by that WTRU of the number of reservation periods that should be reserved. The RCI may indicate sensing results (e.g., RSRP, RSSI, and resource occupancy/availability information) obtained by a specific WTRU's sensing procedure.

A WTRU that receives a resource reservation signal for a group may transmit coordination information (i.e., its own RCI) as part of its own transmissions, or within the subresource reserved for it. The coordination information may serve other WTRUs that transmit the resource reservation signal for determining the resources to be reserved in a future reservation period, or in determining the RCI to be transmitted. The coordination information can be transmitted in a control message (e.g., a MAC CE, or sidelink RRC message) and may be appended to any data transmitted by a WTRU on its own subresources.

The coordination information may include the WTRU's own member ID or similar ID identifying the WTRU, which may be provided by the application layer. The coordination information may include sensing results, such as an indication of the available/unavailable resources as determined by the WTRU. The sensing results may be further specific to a subset of overall resources (e.g., time, frequency, BWP, beam) that may be indicated for that WTRU in the RCI. The coordination information may include a number of reservation periods for which the WTRU intends to maintain/keep use of its assigned subresources. The coordination information may include QoS information of resources in the WTRU's buffers, such as priority, latency, periodicity, rate, range requirements, and payload. The coordination information may include absolute values of or change in value of timing, size, and periodicity of any periodical information received from upper layers, such as periodic CAM traffic or similar periodic application layer traffic. The coordination information may include a difference or time offset between a WTRU's assigned subresource and arrival of data to be transmitted in the subresource. Potential changes to this time difference may be included. The coordination information may include buffer status of a WTRU.

A WTRU may receive RCI from a designated WTRU that indicates a set of resources on which it should perform regular sensing for availability determination. When transmitting data in its subresources, possibly indicated by the resource reservation signal it receives, a WTRU may include the available/unavailable resources and the number of reservation periods for which it intends to continue periodic transmission in its assigned subresources. This information may be transmitted in a MAC CE included with its own data transmissions.

A WTRU may be identified as the designated WTRU for transmission of a resource reservation signal. The WTRU may receive coordination information from the other WTRUs in a group containing any of the information in the coordination information sent by the individual WTRU. A WTRU may use the received information to perform resource reservation in the next reservation period, and may indicate the reserved resources/subresources in its next transmission of the resource reservation signal.

A WTRU may no longer require the resources booked for it within the resources for the group (e.g., the same resources over a number of reservation periods) for a certain number of reservation periods. In this case, the WTRU may indicate its non-usage of its assigned subresources for future reservation periods. As a result, the WTRU transmitting the resource reservation signal may assign another WTRU in the group to the same subresources by transmitting updated information in the RCI.

A WTRU may transmit a reservation signal as a result of one or more of the following triggers. A WTRU may transmit a reservation signal upon the initiation of a specific service from the application layer, such as a V2X service requiring intra-group communication. A WTRU may transmit a reservation signal upon creation of a logical channel with a certain priority, certain QoS characteristics, specific range requirements, or reservation for communication within a group of WTRUs. A WTRU may transmit a reservation signal upon reception from the application layer of an indication from the application layer to transmit such a reservation signal. A WTRU may transmit a reservation signal upon reception of data from the application layer, possibly associated with a group. A WTRU may transmit a reservation signal based on expiry of a timer, possibly configured by application layer and/or RRC signaling and/or broadcast system information.

A WTRU may transmit a reservation signal upon reception by the PHY layer of a reservation signal transmitted by another WTRU. This trigger may be further conditioned on one or more of the following criteria. If the received reservation signal contains a group ID which matches one of the activated or configured group IDs at the WTRU, the WTRU may transmit the reservation signal. If the received reservation signal is received with a power below a threshold, the WTRU may transmit the reservation signal. If the received reservation signal indicates that the WTRU's position in sequence is a specific position, the WTRU may transmit the reservation signal. If a WTRU's member ID or position within a sequence of transmission matches the next expected transmission, as determined by the received reservation signal, the WTRU may transmit the reservation signal. After a configured or indicated time following reception of the reservation signal, the WTRU may transmit the reservation signal. The WTRU may transmit a reservation signal if the received reservation signal is measured below a threshold. The WTRU may transmit a reservation signal if the received reservation signal is received from a WTRU whose distance is above/below a threshold.

A WTRU may receive an indication from upper layers (e.g., a V2X application layer, a V2X control layer, a ProSe layer, or NAS) to start transmission of a reservation signal for a specific group associated with a group identifier. The WTRU may transmit a reservation signal periodically following reception of such higher layer indication, until receiving an indication to disable/stop transmission of the reservation signal.

A WTRU may receive an indication from the upper layers to start transmission of a reservation signal for a specific group associated with a group identifier, and the WTRU may transmit the reservation signal upon reception of data intended for that group of WTRUs received from the upper layers.

A WTRU may receive an indication from the upper layers that it is part of a specific communication group. The WTRU may transmit a reservation signal when it detects a resource reservation signal transmitted by another WTRU in a previous reservation period if the RCI indicates that the resource is still available in the next reservation period and the WTRU is next in the sequence to transmit on the reserved resource.

A WTRU may be configured or indicated, for example, by application layer or by reception of sidelink control messages from one or more other WTRUs, to reserve resources to be used by a group of WTRUs. For example, one or more WTRUs of a group may be designated or allowed (e.g., as configured by the application layer) to reserve resources for usage by all WTRUs in the group. The WTRU may perform a resource selection procedure, which may consist of determining a set of available resources based on sensing results. The WTRU may transmit a reservation signal to reserve the selected resources which are available based on sensing results. The WTRU may further perform resource selection for multiple WTRUs, possibly associated with a group. The WTRU may determine the amount of resources to be selected, as well as the structure of the resources.

Resource structure may refer to a periodicity of resources. For example, resource selection may select a number of resources occurring with a fixed periodicity. Resource structure may refer to a number of subresources. For example, a WTRU may select a fixed number of subresources for a single or multiple one-shot transmissions by each WTRU.

Resource structure may refer to time spacing between subresources. For example, resource selection may select a number of subresources associated with each resource. Each subresource may be usable by a single WTRU in a group. The time difference (in slots) between such subresources may be fixed or may be such that they do not exceed a specific maximum time difference.

Resource structure may refer to the size of each subresource. Subresources may be reserved so that each subresource is of the same size, or may have some relation in size between each subresource.

The size of each subresource may be provisioned to support the maximum packet size of each WTRU transmission in the group reservation. The size of each subresource may be determined by the data rate requirements of each WTRU. The size of each subresource may be indicated by the application layer. The size of each subresource may be determined by the size of the data required for transmission by the WTRU transmitting the reservation signal.

Resource structure may refer to a frequency range (e.g., BWP) over which any portion or all of the resources should be reserved. For example, resource selection may reserve all resources only in a specific BWP, or a first number of subresources in a first BWP and a second number of subresources in a second BWP.

Resource structure may refer to a beam or set of beams over which any portion, or all of the resources should be reserved. For example, resource selection may reserve resources only from a subset of beams, beam directions, or pools associated with beam directions.

A WTRU may transmit information related to the resource reservation structure in its own transmission. The information may or may not be accompanied by its own data transmission. For example, a WTRU may transmit the information above in an SCI. The information may be identified by indexing of certain fixed resource structures (e.g., as per a table).

During resource selection, a WTRU may determine the size and structure of the resources to be selected based on one or more of the following criteria. The determination may be based on the amount of data the WTRU itself needs to transmit (i.e., the size of data pending in WTRU's buffer). For example, the WTRU may reserve N subresources of size M. The size M may be determined based on the size of data the WTRU needs to transmit. The number N may be determined by the application layer data, for example, indicating the number of WTRUs currently in the group.

The determination may be based on the QoS characteristics of data to transmit (e.g., delay requirements, priority, data rate, reliability, and transmission range). The determination may be based on MCS as determined by the WTRU or by the gNB. The determination may be based on occupancy measurements (e.g., CBR measurements) made by the WTRU or communicated to the WTRU by other WTRUs, possibly in the same group. The determination may be based on beam-level quality measurements. The determination may be based on group-specific information obtained from the application layer. For example, the number of subresources may be indicated by the application layer, or may be derived from an indicated number of WTRUs in the group. The spacing between different subresources may be directly indicated by the application layer.

The determination may be based on an expectation of the size of the transmission from the other WTRUs, potentially based on the size of the transmission of the designated WTRU. For example, the designated WTRU may transmit a request message, from which it expects a response from multiple WTRUs. The size of the response message may be deterministic.

A WTRU may be configured to transmit a reservation signal along with its own data transmission intended for a group. The WTRU may receive a set of parameters for group reservation from the higher layers which consists of a time interval between subresources, a number of subresources associated with a resource, a subband (e.g., BWP) for the resources, and a group identifier. Upon reception of data from upper layers associated with the group or upon the initiation of a service specific to the group, the WTRU may perform resource reservation procedure by which the WTRU does one or more of the following. The WTRU may determine the amount of resources for one subresource based on the size of its own transmissions. The WTRU may determine the subresource pattern and/or the periodicity of the reserved resources. The WTRU may determine the number of subresources to reserve based on the application layer information. The WTRU may select a set of subresources which match the required time interval and subband from the higher layers. The WTRU may transmit a resource reservation signal (possibly with its own data) that indicates the presence of its own data as well as the reservation of other resources usable by other WTRUs.

A WTRU may perform a group resource reservation procedure in conjunction with other resource reservation/transmission that may not be associated with the group. For example, the procedure may be used only when the data received by upper layers is associated with group identifier configured at the WTRU.

A WTRU may transmit a reservation signal along with its own data transmission. The reservation signal may be a response message to its own transmission. The WTRU may reserve enough resources for a single response by each WTRU. The WTRU may autonomously reserve the timing of the resources for each of the WTRU responses such that one or more of the following criteria may be met. The WTRU may receive all responses within a specific time frame, whereby the time frame may be related to the QoS of the request/response. or any data which depends on the request response. The response messages may not overlap in time/frequency/beam. The response message of one WTRU in the group may also be received by another WTRU in the group.

A WTRU may be configured to monitor sidelink transmissions for a resource reservation signal and use resources reserved by another WTRU which were intended for group communication. Upon reception of a resource reservation signal indicating resources available for transmission by a group (e.g., identified by a group identity transmitted in SCI), the WTRU may transmit pending data intended for the associated group identity in a portion of the reserved resources, such as in a subsource of the resources identified in the resource reservation signal. A WTRU may use the resources only for transmission of data intended for the specific group for which the WTRU resources were reserved. If the WTRU does not have pending data intended for the group associated with the resource reservation signal, the WTRU may ignore the resources and not use them for transmission.

A WTRU may transmit non-group data in a subresource associated with a group, but it may prioritize group data over non-group data. More specifically, the WTRU may utilize the entire subresource for group-based data as long as it has data associated with that group. Otherwise, it may use the resources to also transmit non-group-based data.

A WTRU may delay transmission of group-data until the occurrence of its associated resource within the group or subresource. The decision to delay transmission of group-data may be conditioned on the time remaining until the occurrence of the group data (e.g., as determined by the RCI) as well as the priority and/or latency requirements of the group data. For example, the WTRU may compare the required time for transmission of the group data upon arrival of the packet to the expected occurrence of the group subresource. The WTRU may decide to delay transmission until the occurrence of the subresource, as long as the subresource occurs some time delta prior to the required transmission time. The time delta may be zero. If a WTRU determines not to wait for the group subresource, it may perform resource selection and transmission on a non-group resource.

A WTRU may be required to transmit data with a specific priority (e.g., as determined by the PPPP) in the group resource. More specifically, the group resource may be associated to data having a specific priority. The priority associated with the group resource may be contained in the group reservation signal (e.g., in the SCI). A WTRU may be allowed to transmit only group data matching the priority transmitted in the reservation signal. The WTRU may also transmit data of any priority (e.g., less than or greater than the priority in the reservation signal) in the group resource.

A WTRU may change the priority associated with a group resource. The change may occur at the time in which the WTRU decides to perform reselection for the group resource, as described herein.

In addition to the data associated with the group, the WTRU may also transmit RCI. The RCI may contain the buffer information associated with data intended for the group. For example, the WTRU may transmit the amount of data in its buffers intended for the group, possibly with priority/reliability or other QoS information. The WTRU may indicate within the RCI whether segmentation was required to transmit the data in the allocated resource. The WTRU may also indicate the size of the packet which required segmentation to fit in the group subresource.

If the WTRU does not have data to transmit associated with the group, it may transmit RCI indicating it will not need the resource in the next reservation period or transmit a buffer status indicating it has no data in its buffers associated with the resource.

A WTRU may indicate in RCI that it was not able to use the group resource because the WTRU decided to use a transmission on a non-group resource (e.g., due to the group resource not meeting the WTRU's latency requirements). The WTRU may also indicate the amount of time by which the group resource was not able to meet its latency requirements.

The WTRU may indicate in RCI that it detected SCI transmission by another WTRU that schedules a non-group transmission that collides with the its own group scheduled transmission.

The WTRU may indicate in RCI the presence of buffered group data with a priority which is different than the priority allowable for transmission on the group resource.

A WTRU may make a resource reselection decision when the resource reserved for the group is an SPS-like or forward-booked resource intended for use by WTRUs of the group. Resource reselection may be performed by any WTRU in the group or resource reselection may be performed by only a single WTRU. For example, in a case where each WTRU transmits the resource reservation signal, which may include SCI and RCI, to schedule its own transmissions, any WTRU may perform resource reselection prior to its own scheduled transmission. In a case where a single WTRU (e.g., a designated WTRU) transmits the SCI to schedule all of the group subresources, resource reselection may be performed by only a single WTRU in the group.

A WTRU may perform resource reselection based on one or more of the following triggers or conditions. Resource reselection may be performed by a WTRU prior to its own scheduled transmission on a resource or subresource. For example, a WTRU may not be allowed to perform resource reselection until the WTRU determines (e.g., by RCI and member ID) that the next resource is reserved for its own transmission.

Resource reselection may be performed if a resource does not meet the WTRU's own latency requirements. For example, a WTRU may determine that the expected timing of its next resource does not meet the latency requirements of a packet that arrives from the upper layers. The WTRU may perform resource reselection in order to schedule its own transmission at an earlier point in time as compared to the scheduled periodic resource.

Resource reselection may be performed if a resource does not meet the WTRU's own buffer requirements. For example, the WTRU may determine that the allocated resource/subresource would require segmentation of the packet at L2 and the WTRU may decide not to segment the packet.

Resource reselection may be performed if transmission of control information (e.g., RCI) from other WTRUs indicates that the latency and/or buffer requirements of other WTRUs are not met. For example, a WTRU may receive RCI from one or more other WTRU transmissions in the group. The WTRU may perform resource reselection if one or more of the WTRUs indicate one or more of a need to segment a packet to transmit it in the group resource, an inability to transmit group data within the allocated group resource due to the group resource not meeting latency requirements, and a detection of collision of subresources with another non-group transmission.

Resource reselection may be performed upon detection of a scheduled transmission by another WTRU not belonging to the group or a non-group transmission that collides with a scheduled resource. This may be performed potentially only if the non-group transmission is determined to be higher priority than the group transmission.

Resource reselection may be performed if a different carrier, bandwidth, or beam becomes better than the current carrier, bandwidth, or beam by a predetermined or configured amount. For example, a WTRU may maintain CBR measurements of the current carrier, bandwidth, and beam in addition to other carriers, bandwidths, and beams and may decide to reselect when the CBR of another carrier, bandwidth, and beam is lower than the current one.

A WTRU may receive RCI from one or multiple WTRUs associated with its group. If the WTRU receives more than a predetermined or configured number of RCIs from different WTRUs, each indicating that the group subresource was not able to meet latency requirements, the WTRU may perform resource reselection for the group resource. The WTRU may utilize the latency requirements of the other WTRUs in the RCI to schedule the group resource.

The WTRU may be configured to echo a received resource reservation signal under one or more of the following conditions. The WTRU may echo the received resource reservation signal if it is configured to do so by the application layer, either explicitly or implicitly (e.g., through the configuration of a member ID which has some specific value and every N member IDs performs echoing). The WTRU may echo the received resource reservation signal if the received value of the group SCI transmitted by the designated WTRU or any group RCI corresponding to the WTRU's group has a quality (e.g., RSRP) below a threshold. The threshold may depend on the PPPP/PPPR of the transmissions allowable for the group.

The above method may be advantageous to use in a single WTRU scheduling subresources for multiple WTRUs in subsequent subframes. If the distance between different WTRUs in a group is large, other WTRUs in the vicinity of the group may not be able to detect the initial SCI transmission and may select resources that collide with the group resource. Repeating (i.e., echoing) the group resource may avoid such resource collision by other WTRUs performing resource selection.

Figure 2:
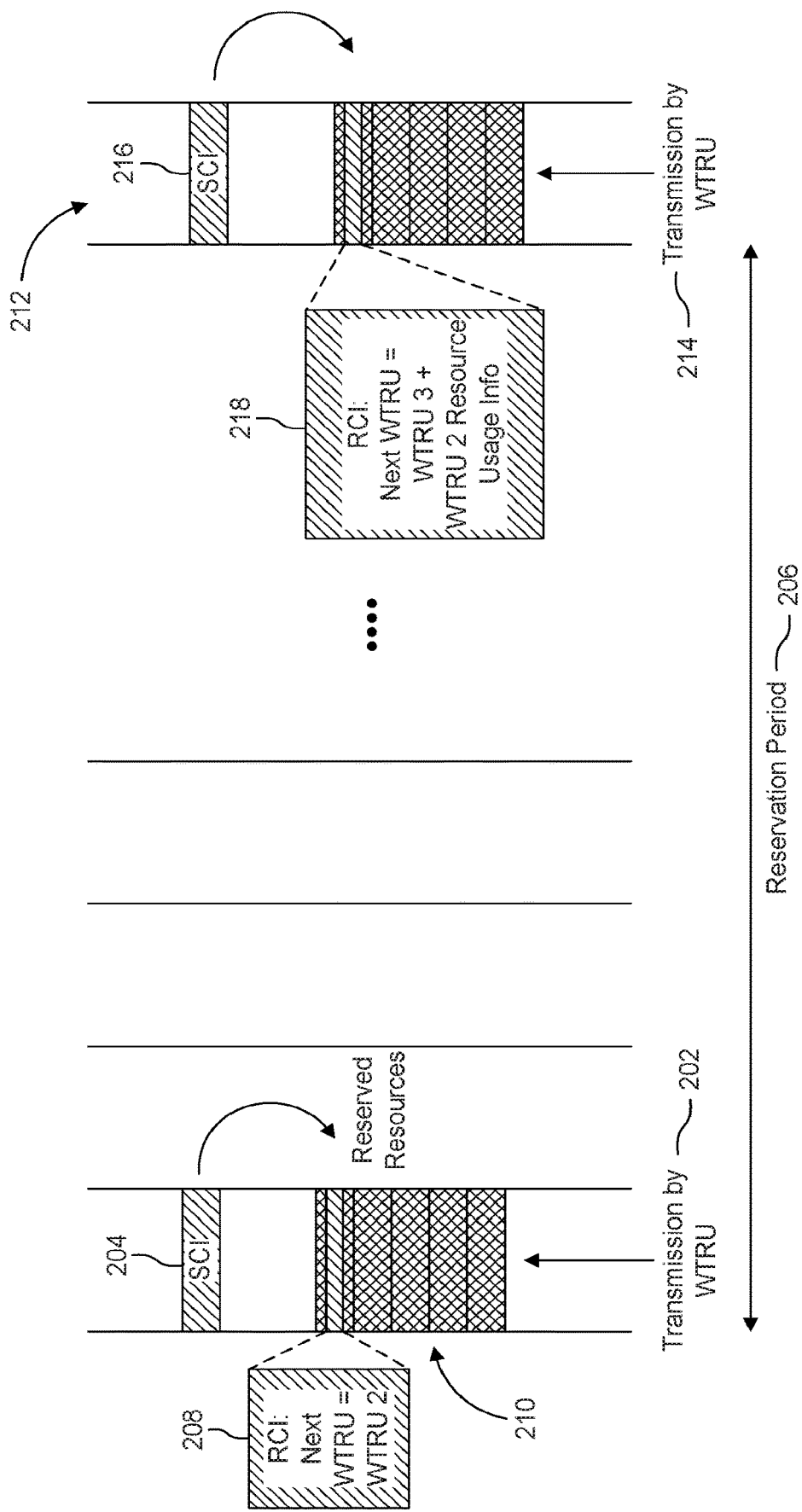
FIG. 2 is a diagram illustrating a first method of group reservation using subresource coordination.

Referring now to FIG. 2, a diagram illustrating a first method of group reservation using subresource coordination is shown. In this method, an SCI may schedule transmission for a single WTRU. A first WTRU 202 may transmit a first SCI 202 or resource reservation signal to schedule transmissions for itself in a first reservation period 206. Forward booking in the SCI 204 for a specific resource reservation period may be used to reserve resources for transmissions by other WTRUs in the group. The first WTRU 202 may transmit a group reservation using the SCI 204, or equivalent sidelink scheduling message, in combination with a first RCI 208. The first RCI 208 may be transmitted as a MAC CE on the PSSCH.

The first WTRU 202 may set the contents of the SCI 204 to indicate resources 210 being scheduled by the first WTRU 202. The first WTRU 202 may indicate a forward booking indication depending on whether the same resources are reserved in a future reservation period. The SCI 204 may include a group identifier field. The first WTRU 202 may set this field to the group ID of the group for which resources are being reserved. The scheduling information in the SCI 204 may indicate the specific resources reserved in the scheduling information. The resources 210 may be one or a set of subframes/slots and resource blocks within each subframe/slot. The first WTRU 202 may include the first RCI 208 in its own transmissions in the resources indicated by the first SCI 204. The first RCI 208 may be sent as a MAC CE multiplexed with the first WTRU's 202 transmissions on PSSCH. The first RCI 208 may include an indication of whether or not the first WTRU 202 intends to utilize the same resource (reserved by the first SCI 204) in a next reservation period 212 and/or the sequence of WTRUs which should utilize the group resources in the next reservation period 212. As shown in FIG. 2, the first WTRU 202 may use the first RCI 208 to indicate that a second WTRU 214 should transmit in the resources in a second reservation period 212.

The first WTRU 202 may include the entire sequence of WTRU IDs so that the second WTRU 214 may know its own turn in the sequence of transmissions based on the WTRU ID of the last group reservation signal and this sequence. The second WTRU 214 may be a member of the same group and may decode the first SCI 204 containing the group ID and read the MAC CE. The second WTRU 214 may transmit in the same resources in the second reservation period 212 if it determines it is the next WTRU in the sequence (i.e., the resource is assigned as a transit resource for this WTRU). Otherwise, the second WTRU 214 may only receive the transmissions in the next reservation period and/or decode the first RCI 208.

The second WTRU 214 may transmit a second SCI 216 schedule the resources in the second reservation period 212. The second WTRU 214 may also send a second RCI 218 in its own transmissions in the resources indicated by the second SCI 216. As shown in FIG. 2, the second WTRU 214 may use the second RCI 218 to indicate that a third WTRU (not shown) should transmit in the resources in a third reservation period.

Figure 3:
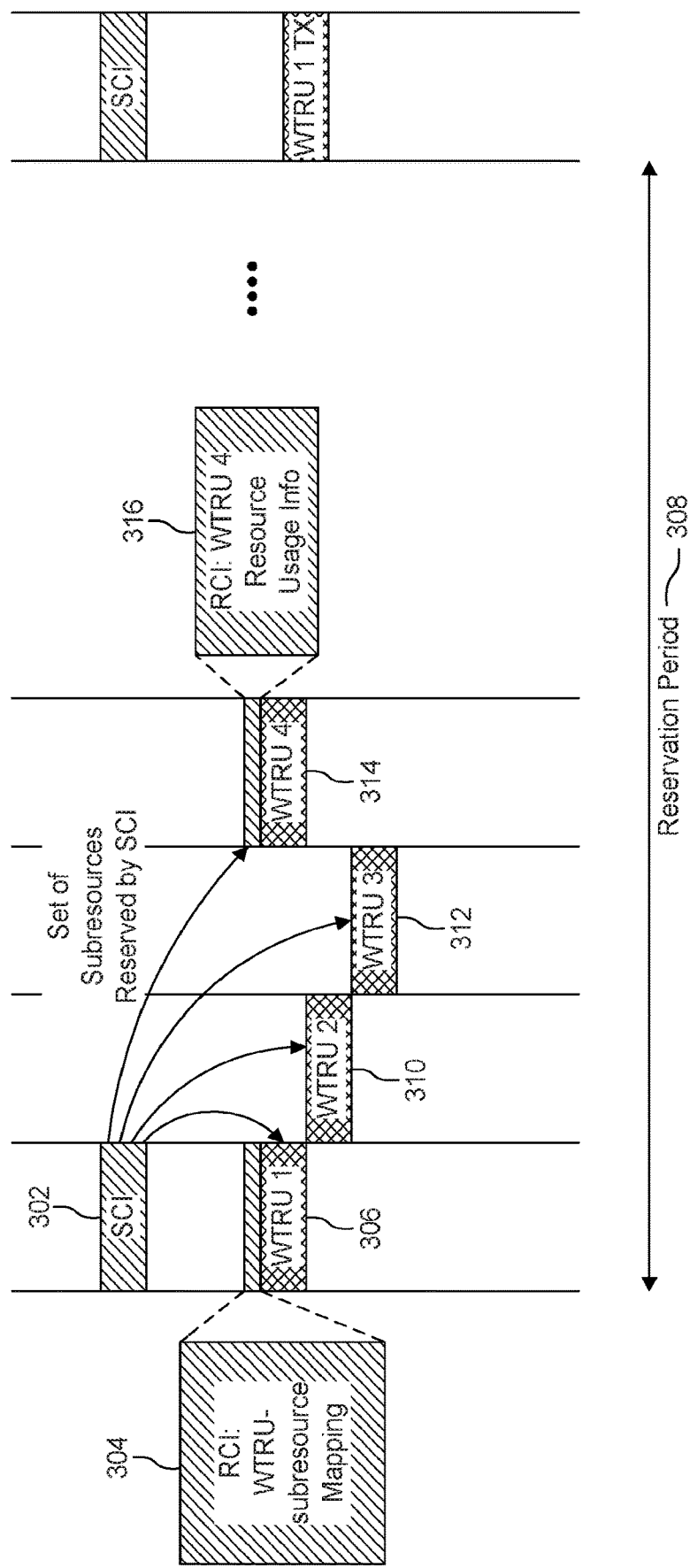
FIG. 3 is a diagram illustrating a second method of group reservation using subresource coordination.

Referring now to FIG. 3, a diagram illustrating a second method of group reservation using subresource coordination is shown. In this method, an SCI may schedule transmissions for multiple WTRUs in a reservation period. Single WTRUs may be assigned a subresource of the SCI scheduled resource. Forward reservation may be used to reserve subsequent resources for the WTRUs in the case of periodic transmissions by the group.

A first WTRU may transmit a group reservation signal using a first SCI 302 and a first RCI 304, for example, using the PSSCH. The first WTRU may include scheduling information, group ID, and forward booking signals in the first SCI 302 for a first reservation period. The first WTRU may also transmit a formatting or indication of the subresources within the first reservation period 308. More specifically, the first WTRU may provide an indication of the size and location of each subresource in the resource reserved by first SCI 302. The first WTRU may transmit data destined for the indicated group in the first subresource 306 indicated by the first SCI 302. In addition, the WTRU may transmit the first RCI 304 in a MAC CE using this first subresource 306. The MAC CE may contain the sequencing of member WTRU ID transmissions to be used within the subresources. Each subresource may be used for the transmission of data from a single WTRU associated with the group. A WTRU that receives the first SCI 302 may determine the subresource structure and decode the first subresource 306.

Based on the contents of the first RCI 304 transmitted in the first subresource 306, the WTRUs in the group may determine their own subresources. The WTRUs may transmit data associated with the group in their own subresources. For example, a second WTRU may transmit data in a second subresource 310 in the first reservation period 308. A third WTRU may transmit data in a third subresource 312 in the first reservation period 308. A fourth WTRU may transmit data in a fourth subresource 314 in the first reservation period 308. A WTRU may transmit usage information using its on RCI. For example, the fourth WTRU may transmit a second RCI 316 indicating its resource usage information.

If a WTRU does not have data to transmit associated with the group, it may transmit an RCI indicating it will not need the resource in the next reservation period. This information may be used by the initiator of the RCI (e.g., a designated WTRU) to determine the schedule for the next reservation period, or to determine whether the group resource needs to be reserved at all for the next reservation period.

A WTRU that transmits the group reservation signal may determine the need for reserving group resources in a future reservation period based on the transmissions of RCI or control information in each of the subresources of a previous reservation period. More specifically, a WTRU may decode the RCI or similar control information from each WTRU in each of the subresources of a reservation period. Based on this information, the WTRU may determine whether to keep or not, the resources for the next reservation period. The determination may be based on one or more of the following: the number of WTRUs that still have data to transmit associated with the group; the buffer occupancy of each WTRU in the RCI; the detected RSSI, RSRP or similar in each of the subresources in the previous reservation period; and a random number of reservation periods, potentially chosen at the first transmission of the group reservation signal associated with the specific resources, and which is decremented at each transmission of the reservation period associated with the same resources.

If the WTRU decides to keep the resources based on the above conditions, the WTRU may transmit a resource reservation signal associated with the same resources in the next reservation period. Alternatively, based on the above information, the WTRU may decide to perform a reselection procedure to reserve a different set of resources, possibly with larger or smaller size, and possibly to accommodate the other WTRUs in the group based on the information sent in their RCI. Alternatively, the WTRU may decide to reserve the same or a different set of resource but for use by a subset of the WTRUs in the group, possibly those that still have data to be transmitted. The WTRU may also decide to not reserve any resources in the reservation period, and not transmit any group reservation signal if, for instance, none of the WTRUs have data pending in their buffers.

A WTRU configured to transmit a group reservation signal may select a random number between n1 and n2, and may transmit a group reservation signal with a forward booking indication set. Upon transmission of each resource reservation signal, the WTRU may decrement the random number. When the random number reaches 0, the WTRU may perform a resource reselection procedure for the group resources as long as the WTRU still has data in its buffers and at least n WTRUs in the group have at least x bytes of data in their buffers associated with group communication. The WTRU may decide to keep the existing resources in the next reservation period if the counter has not reached 0 and at least y of the WTRUs in the group have indicated that they still have at least x bytes of data in their buffers associated with group communication. In addition, the WTRU may change the RCI for transmission of the next group reservation signal to change the set of WTRUs that have an assigned subresources and the size of the subresources based on the RCI information received from each WTRU.

A WTRU may implicitly or explicitly associate a subresource within the set of resources indicated by the resource reservation signal to be used for its own transmissions. A WTRU may determine to use a specific subresource within the resources indicated in a reservation signal based on one or more of the following: an explicit mapping based on ID or similar identification; sequencing information, such as RCI transmitted by a WTRU, the network, or the application layer which may be transmitted in either the PDCCH or the PDSCH; priority of data to be transmitted, including delay requirements of the data; arrival time of the data to be transmitted; range of data to be transmitted; previous transmissions by other WTRUs in the same subresource (e.g., during a prior reservation period, or prior transmission of reservation signal); measured RSRP, RSSI, or CBR associated with the subresource during a prior reservation period or associated with priori transmission of the reservation signal; distance from or relation to the WTRU that transmitted the resource reservation signal; and validity, from the perspective of the transmitting WTRU, of the sensing results used by the WTRU which performed the resource selection.

A WTRU may determine the subresource in which it can send its own transmissions based on an identifier assigned to it, such as a group member ID. For example, the WTRU may determine that it can use the $i^{th}$ subresource if its group member ID modulo N=i.

A WTRU with pending transmissions associated with a group identifier may determine the subresources associated with its own transmission within the set of resources reserved for the group using resource coordination information (RCI).

A WTRU may determine its transmission subresource based on RCI under certain conditions associated with the sensing results used by the WTRU which performed the resource selection and/or transmission of the resource reservation signal. More specifically, a WTRU may use its transmission subresource indicated in RCI if and only if its own sensing results indicate the availability of its transmission subresource.

A WTRU may use its transmission subresource if and only if the received quality of the reservation signal is above a threshold.

A WTRU may use its transmission subresource if the distance to the WTRU which transmitted the resource reservation signal does not exceed a threshold. In such case, the RCI or the resource reservation signal may contain the geolocation of the WTRU that transmitted the resource reservation signal.

If a WTRU is not able to use its subresources in the resources indicated by the reservation signal and/or RCI, the WTRU may initiate its own resource reservation procedure (sensing and resource selection) and/or re-transmit the resource reservation signal, possibly using its own subresources, or using a predefined subresource for that purpose.

A WTRU may determine the coordination of a group resource (i.e., when to transmit within a resource reserved for a group) based on configuration of an ordering from the application layer. More specifically, the WTRU may receive a member ID, member index, or similar index that indicates its sequence within the group. The sequence may dictate when and in which subresource the WTRU may perform its own transmission.

A WTRU may receive a group member index of N and determine that it should transmit in the $N^{th}$ subresource associated with a group reservation. The $N^{th}$ subresource may be determined in both time and frequency spaces. For example, the SCI may designate x subchannels over y consecutive slots, and further indicate a subresource to correspond to a single subchannel. The WTRU may then determine the $N^{th}$ subresource by indexing (first by subchannel in a given slot) and continuing the indexing of the subchannels in the next slot, until the $N^{th}$ subresource is reached.

A WTRU may determine the timing of its own transmissions based on its member index as well as the member index transmitted by other WTRUs in the same group in the reservation signal. For example, a WTRU with member index N may transmit in the same resource that occurs one resource reservation period after it detects a transmission for the group which contains a group member index of N−1 in the transmitted SCI or RCI.

A WTRU may further determine that it is the designated WTRU (i.e., it should perform resource reservation for the other WTRUs) if it configured with a specific value of the member ID. For example, a WTRU with member ID of 0 may determine that it needs to perform resource reservation for the group of WTRUs. A WTRU that is configured with member ID different than 0 does not perform group reservation and only transmits in its own subresource or according to the sequence indicated by its member ID.

A WTRU may further determine it needs to perform echoing of the reservation signal based on its member ID. For example, certain member IDs may be associated with the task of echoing the reservation signal (e.g., all even-numbered member IDs should perform echoing of the reservation signal). The determination of the need to perform echoing may be based on both the member ID and the subresource configuration. For example, a WTRU may determine it needs to perform echoing if the subresource configuration consists of x subresources in a given time window, and (member ID) (mod x)=0. In other words, the transmission of one echoed reservation signal may be required every subresource configuration window.

A WTRU configured to monitor sidelink transmissions for a resource reservation signal may, upon reception of the resource reservation signal associated with the group to which the WTRU belongs, treat the entire resource reserved by the reservation signal as a contention-based resource. More specifically, the WTRU may perform transmission on the entire resource if it has data available for transmission. The WTRU may then initiate a contention detection and/or contention resolution procedure following the transmission to determine whether its own transmission collides with another WTRUs transmission. The procedure may consist of determining the measured RSCP in the shared resource during transmission on the shared resource. For example, a WTRU may perform an LBT procedure at the beginning of the reserved resource, and may transmit in the reserved resource if the channel is deemed to be clear.

Figure 4:
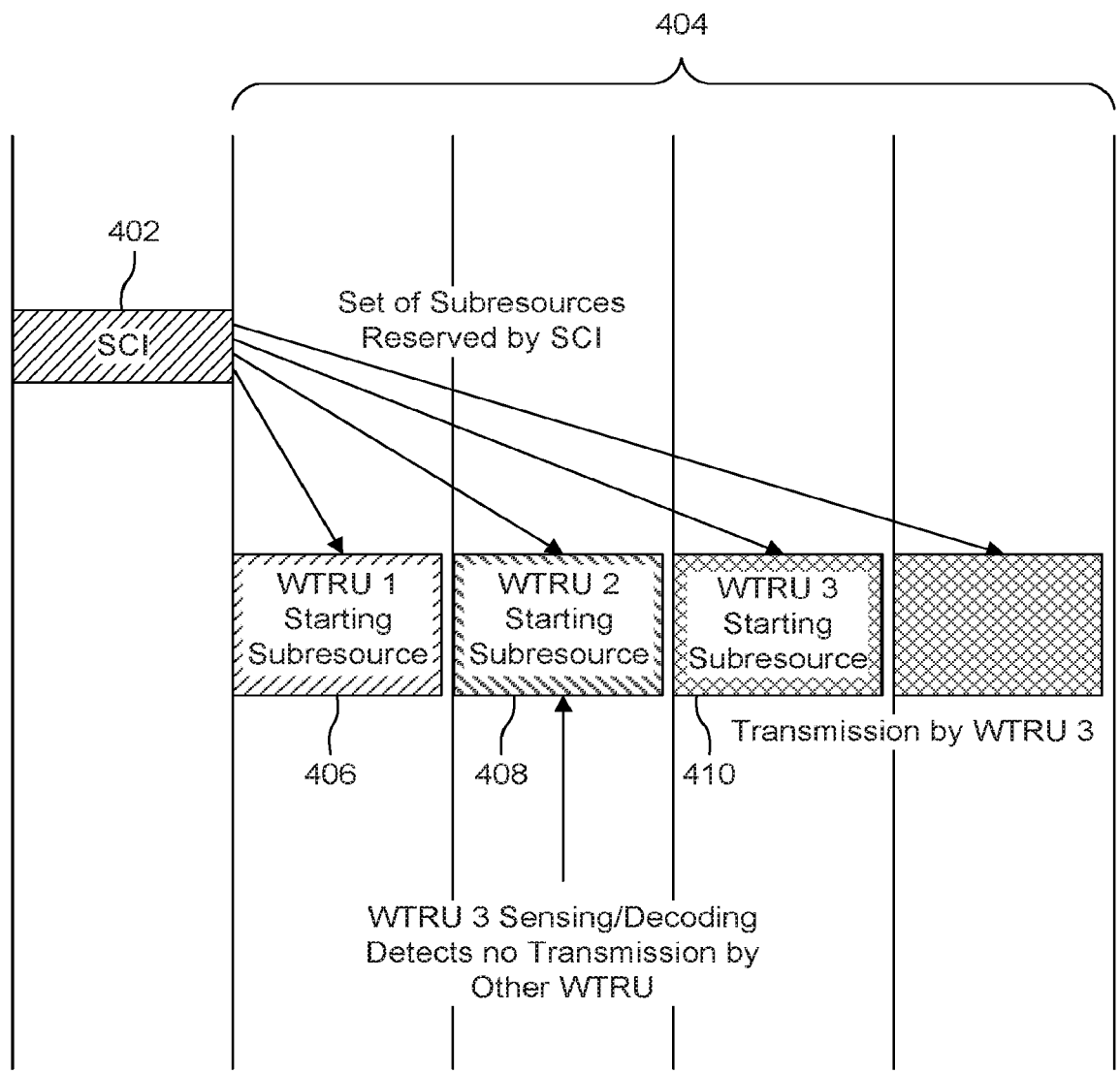
FIG. 4 is a diagram illustrating a method of reserving contention based resources.

Referring to FIG. 4, a diagram illustrating a method of reserving contention based resources is shown. A WTRU configured to monitor sidelink transmission for a resource reservation signal may, upon reception of the reservation signal associated with the group to which the WTRU belongs, transmit on a portion of the resource depending on whether it detects another WTRU in the group already transmitting on that resource. For example, a WTRU may be assigned a sequence number for the starting subresource within a resource. The starting subresource associated with a specific WTRU may be determined by one or more of the WTRU member ID and the RCI. For example, the member ID may range from 1-N, and the starting subresource for that WTRU would be given by the WTRU member ID. The RCI may be transmitted periodically, in the SCI, or in one of the subresources of PSSCH intended for transmission of the RCI.

A WTRU may determine whether it can transmit on the contention-based resource by sensing the subresources occurring in time prior to its own starting subresource location. If the WTRU determines that the resource is not occupied (e.g., the RSRP of each of the subresources is below a threshold), the WTRU may decide to transmit in the remainder of the resource, starting from the WTRUs own subresource. A subresource may consist of any of an OFDM symbol, slot, subframe or multiple subframes, and may be limited to a number of resource blocks in frequency (contiguous or non-contiguous). A subresource may or may not be contiguous in time. The subresources may themselves be contiguous or noncontiguous in time, and may or may not be associated with the same resource blocks. The format of the subresources, the number of subresources may be provided in one or more of the SCI, RRC configuration or preconfiguration, and the data transmitted in a deterministic subresource (e.g., in a MAC CE).

As shown in FIG. 4, an SCI 402 may schedule a set of subresources 404. A first WTRU having a first sequence number may be assigned a first starting subresource 406 based on one or more of the methods described above. The first WTRU may not transmit on the first starting subresource 406. A second WTRU, which may be assigned a second sequence number, may detect that the first WTRU is not transmitting in the first starting subresource 406 and may determine it may transmit in a second starting subresource 408. However, the second WTRU may not transmit in the second starting subresource 408. A third WTRU, which may be assigned a third sequence number, may detect that the second WTRU is not transmitting in the second starting subresource 408 and may determine it may transmit in a third starting subresource 410. The third WTRU may start transmitting in the third starting subresource 410. The third WTRU may transmit through the remainder of the set of subresources 404.

The procedures described above for use of reserved resources for a group of WTRUs may be applied for use with network scheduled resources. More specifically, a group of WTRUs may use resources assigned by the network. As described herein, a number of procedures may be added to enable the use of network scheduled resources by a group of WTRUs.

A WTRU within a group may receive a group RNTI ("Gr-V-RNTI") for resource assignments usable by all WTRUs in a group. The RNTI may be assigned to a WTRU in dedicated RRC signaling. A WTRU may receive the RNTI from the gNB upon joining a V2X group. Alternatively, a WTRU may request a group RNTI upon joining a group of WTRUs. For example, upon indication from upper layers that a WTRU has joined, should join, or should form a group, a WTRU may request a group RNTI from the gNB using a sidelink WTRU Information or similar RRC message. The WTRU may receive a group RNTI as part of the signaling to establish a unicast/multicast link (e.g., a unicast link establishment request to the network or in a network initiated sidelink unicast link establishment message). The WTRU may receive the group RNTI in dedicated configuration. The request for a group RNTI may further contain the WTRU's group identification (as configured by application layer) for the gNB to identify the WTRU group. The WTRU may further derive the group RNTI from the destination ID (e.g., the L2 ID that identifies the unicast/multicast group). For instance, the WTRU may use the entire or the least/most significant bits of the destination ID associated to the unicast/multicast link as the group RNTI. Alternatively, the WTRU may derive the group RNTI from the source L2 ID of one or any of the WTRUs associated in the unicast/multicast link.

A WTRU may monitor PDCCH for a Gr-V-RNTI when configured by application layers as being part of a group and when configured by the network to perform network scheduled V2X communication. A WTRU may not need to monitor Gr-V-RNTI otherwise. A WTRU that joins multiple groups may further be assigned different Gr-V-RNTI values associated to the groups it has joined.

A V-RNTI of a designated WTRU may be used for all assignments by the network of resources to be used for communication in a group of WTRUs. A WTRU may learn of the designated WTRU's V-RNTI from coordination information (e.g., RCI) sent by the designated WTRU. Specifically, a WTRU, when becoming a designated WTRU for a group (e.g., when receiving an indication from the application layer) may transmit an RCI or similar coordination information on sidelink to the other WTRUs in the group including its network assigned V-RNTI.

A WTRU may monitor PDCCH using the V-RNTI of a designated WTRU when configured by the application layer as being part of a group and when configured by the network to perform network scheduled V2X communication. A WTRU may not need to monitor the designated WTRU's V-RNTI otherwise.

A WTRU may further request permission from the network to use a designated WTRU's V-RNTI. For example, upon reception of a designated WTRU's V-RNTI, a WTRU may send a request/indication to the network before using the WTRU's V-RNTI and being allowed to transmit in subresources within the network assigned resources. A WTRU may further receive an indication from the network whether the WTRU can or cannot transmit within resources assigned to the designated WTRU's V-RNTI.

A WTRU may transmit such request/indication to the NW regularly (e.g. based on some timer), or upon a change in the distance (based on geolocation) to the designated WTRU's V-RNTI, change in the designated WTRU for the group, or upon joining another group.

A WTRU that monitors a V-RNTI associated with another WTRU may further receive an additional indication (e.g., a DCI) in a resource grant from the network. A WTRU may utilize the indication to distinguish a resource grant usable by a group vs a resource grant allocated only for use of the individual WTRU associated with the V-RNTI. The indication may take on two values, group vs individual. A value of group indicates that the WTRU may utilize a subresource in the resources allocated using V-RNTI. A value of individual indicates that this is not permitted.

A WTRU may transmit within a subresource of a network allocated resource using the mechanisms described above for WTRU autonomous transmission, which may be based on transmission of RCI by one or multiple WTRUs. In addition, a WTRU may receive RCI from the network as part of an RRC message, MAC CE, DCI, or similar message transmitted by the gNB.

A WTRU may request semi-persistent sidelink resources usable for a group of WTRUs. The WTRU may receive indication from the application layer to initiate such a request to the network. More specifically, a WTRU may provide assistance information for requesting sidelink SPS resources that reflect the resource requirements of a group of WTRUs. A WTRU may account for the resource requirements of other WTRUs in a group when requesting SPS resources from the network, and/or when sending WTRU assistance information for SPS resources from the network. More specifically, the WTRU requesting the SPS resources may increase or scale the number of required SPS resources compared to its own resource requirements based on additional information. The additional information may include one or more of the following. The additional information may be the number of WTRUs in the group, possibly provided by the application layer. The additional information may be a factor (e.g., multiplier) compared to the WTRU's own periodicity of resources, possibly provided by the application layer and. The factor may represent the number of WTRUs in a group, the number of WTRUs in the group that have a blocking relationship, the number of WTRUs that need to process and relay a message, or the number of duplications required for a message to be broadcast to the entire group. For example, if a WTRU determines its periodicity of communication for a specific service is 300 ms, and the application layer indicates a factor of 10, the WTRU may request SPS resources with periodicity of 30 ms.

The additional information may be timing offset changes of SPS resources. The additional information may be QoS related information (e.g., priority) of the transmissions pending at the WTRU and intended for the group. The additional information may be range-related information, such as whether the data with pending transmissions that initiated the SPS request needs to be sent over long or short range. The additional information may be a frequency band of operation, such as whether transmission between the group members is over high frequency (e.g., mmWave).

A WTRU may initiate a request for SPS sidelink resources by sending WTRU assistance information. If the WTRU is the designated WTRU of a group (e.g., as determined by the application layer), the assistance information may be based on the WTRU's own resource needs as well as potential resource needs of other WTRUs. A WTRU may request a shorter period SPS (e.g., by a factor x) compared to its own SPS period. The factor x may be received from the application layer or it may be deduced/derived from information provided by the application layer.

A WTRU may determine the need for the periodicity of its own packet arrivals to be scaled, and an amount by which it should be scaled, in its request for SPS resources. This may be based on topology (e.g., the number of vehicles that may be in a position of blocking, as indicated by upper layers), frequency band (e.g., scaling may be required when transmission is on mmWave), and QoS (e.g., scaling may be required depending on priority or reliability of the packets received from higher layers).

A WTRU may use one or more of the following rules to determine whether its own packet periodicity needs to be scaled before requesting SPS resources with a specific periodicity. Scaling may be performed if transmitting on mmWave and using beam angle<x. Scaling may be performed if priority of the packets associated with periodic transmission is higher than a certain value. If scaling is to be performed based on one or more of the above determinations, the scaling may be by the factor provided by application layer.

A WTRU may determine the specific time/frequency resource it may use to transmit data intended for a specific group based on one or more of the following criteria. The WTRU may use RCI or similar information transmitted by another WTRU over sidelink or by the network to determine the time/frequency resource. For example, sequencing information for resource usage among the WTRUs may be contained in RCI. The WTRU may use timing of data arrival with respect to the specific resource to determine the time/frequency resource. For example, a WTRU may assume the resource having the smallest latency compared to the arrival of the packet may be used for transmission of the packet. For example, the WTRU may use the next single resource in time in the SPS grant which follows the arrival of the packet to the AS layer.

The WTRU may use the WTRU ID within a group assigned by application layer or network to determine the time/frequency resource. A WTRU having group WTRU ID M may transmit in the Mth (Mod n) resource in time of an SPS grant following reception of the grant. The values of M and n may be provided by higher layers.

In addition, the WTRU may use the priority of data to be transmitted, including delay requirements of the data, the arrival time of the data to be transmitted, the transmission range of data to be transmitted, previous transmissions by other WTRUs in the same subresource, and measured RSRP, RSSI, or CBR associated with the subresource or other subresources, possibly during a prior reservation period, to determine the time/frequency resource.

Based on SA1 requirements, the AS may be able to control the communication range for a message based on the characteristic of the message transmitted by a WTRU. These characteristics may be determined by the application layer and may be related to the type of application layer message (e.g., intended for the entire group of WTRUs, or intended for a single WTRU in a group). To ensure resource efficiency, a WTRU may set its transmission parameters to assume the worst case transmission range, such as transmission from the head of the group to the tail of the group, or considering the worst case group length, assuming WTRUs in a group follow each other in a longitudinal fashion on the road.

A WTRU may receive one or more parameters associated with the range of a message to be transmitted from the application layer. In this context, the term "range" may refer to the distance to be reached by a WTRU's transmission, or a distance over which reliable transmission may be ensured. The one or more parameters may be associated with the QoS of the packet to be transmitted. The one or more parameters may be provided with each packet received from the higher layers (e.g., "per packet" range). Alternatively, the WTRU may receive a range requirement QoS parameter associated with a specific destination address and/or upper layer flow and/or bearer and may assume the same range to be applicable to all packets received having the same destination address/flow/bearer. Alternatively, the range requirement may be derived implicitly from other parameters provided by the upper layers such as a specific QoS parameter, or the destination address (e.g. multicast vs groupcast).

The one or more parameters associated with range may take a finite number of values. Each value may further be associated with any of the following parameters. The value may be associated with a specific physical distance of transmission using a single sidelink transmission The value may be associated with a specific physical distance of transmission assuming relayed sidelink transmission. The value may be associated with a physical transmission direction and/or coverage corresponding to whether the packet needs to be transmitted to vehicles behind the said WTRU, both behind and in-front of the said WTRU, in all directions around the said WTRU.

The one or more parameters associated with range may alternatively take on a finite number of values with a qualitative association, for example, short range, medium range, and long range.

A WTRU may change or adapt one or a number of transmission parameters for a packet based on the received range value associated with that packet. The range value may be further derived from a QoS characteristic associated with the packet (e.g., through a configured table). For example, a QoS value x may indicate a specific entry in a table and that entry in the table may be further associated with a specific value of range requirement. Range requirements may take on any number of distinct possible values (e.g. 1-x, or low/medium/large, etc). This adaptation may allow the WTRU to achieve the required range for V2X transmission without having to assume worst-case transmission parameters required for all V2X transmissions.

The WTRU may associate one or more range values with a specific unicast or multicast link. More specifically, the WTRU may associate one or more range value with one or more of the following: a destination ID, a unicast/multicast link ID (either determined by the WTRU, from upper layer, or provided by the network), a logical channel, radio bearer, or group thereof, a QoS flows or group of QoS flows. The WTRU may make the association at one or more of the following times: at creation of a logical channel or radio bearer, at the initiation, by the upper layers, of a unicast/multicast link with one or more WTRUs, and during signaling with the network for establishing a unicast/multicast link with one or more WTRUs.

The WTRU may receive an association from the upper layers or from the network. More specifically, the WTRU may receive an indication from the upper layers to initiate a unicast/multicast link with a specific destination ID and/or unicast/multicast link ID. The WTRU may be provided an associated QoS value (e.g., VQI) from which the WTRU may derive a range. The WTRU may then apply the transmission parameters applicable to the range values for each packet it receives from upper layers having the specific destination ID or unicast/multicast link ID.

A WTRU may receive the association of range value to TX parameters from the network. More specifically, a WTRU may initiate signaling with the network for establishment of a unicast/multicast link, and may further provide the associated range values applicable for this unicast/multicast link. The network may respond with the applicable TX parameters to be applied to transmit parameters associated with this link. Packets may be associated with a destination ID, logical channel, etc. as described above.

The WTRU may determine the applicable transmission parameter to modify and the specific values to assign such parameter based on one or more of preconfiguration and network configuration.

The WTRU may modify one or more of the following transmission parameters based on the range values or range parameters received from the application layer: number of retransmissions on PSCCH and/or PSSCH, selected resource pool, the min/max/average number of resources selected by the WTRU, use of TX diversity, TX Power on PSCCH and/or PSSCH, selected MCS for transmission, beamforming characteristics (e.g., whether to turn on/off beam forming, beam angle to use, whether to transmit on one or multiple beams, and which beam directions to transmit on relative to another WTRU's transmission), and whether to enable/disable relaying.

The WTRU may select one or a set of values of any of the above transmission parameters based on the range values associated to that transmission.

A WTRU may also determine the applicable value or values of a given transmission parameter based also on other measured aspects of the channel, such as one or more of the following: measured CBR on a set of resources, measured CR at the WTRU, quality of a reference signal transmitted by the network or another WTRU, HARQ feedback from another WTRU, CQI measurements from another WTRU, and measured path loss between a WTRU and one or more other WTRUs (e.g., those involved in the unicast/multicast link).

A WTRU may be configured to maintain path loss estimates and/or channel quality estimates over a unicast link with a paired WTRU (e.g., by measurement of a reference signal transmitted by the paired WTRU). The WTRU may be configured with a set of applicable values for TX power on PSCCH and/or PSSCH for each combination of measured path loss and/or channel quality and range value. The WTRU may receive a packet associated with a destination address which has a range value tied to it. The WTRU may then select the allowable TX power values for transmission of that packet based on the range parameter and the path loss and/or channel quality over the link with the paired WTRU (on the unicast link). The WTRU may further adapt the TX power over the allowable range based on the measured CBR of the channel.

A WTRU may receive a packet from the application layer marked as either short range, medium range, or long range. A WTRU may select a specific MCS value, or select from a subset of allowable MCS values for a short range packet, select a different MCS, or select from a different subset of allowable MCS values for a medium range packet, and likewise for long range packet.

A WTRU may receive a packet from the application layer marked as either short range, medium range, or long range. A WTRU may use a beam angle of x1 for short range packets, a beam angle of x2 for medium range packet, and a beam angle of x3 for long range packet when transmitting the packet over the air.

A WTRU may receive a packet from the application layer with a range parameter value which indicates that the packet requires transmission only to a single direction. The direction may be further specified (e.g., using cardinal directions or relative to a vehicle's heading). The WTRU may decide to transmit the packet only on a single beam or subset of beams associated with the indicated direction. Alternatively, a different packet may indicate transmissions in all directions. The WTRU may decide to transmit the packet in all beams in this case.

A WTRU may be configured with a TX power offset value, a maximum TX power, or a TX power computation formula for each of the range parameter values that can be configured by the application layer. The WTRU MAC may indicate the appropriate TX power offset value, maximum TX power, or computation formula to the PHY layer when the MAC PDU is sent to the PHY layer for transmission. The PHY layer may then apply the associated offset/maximum/formula to the TX power calculation when transmitting the MAC PDU.

The range parameter associated with a transport block provided to the PHY layer may consist of the range associated with the worst case (i.e., largest range) packet that may be multiplexed onto that transport block.

A WTRU may estimate side link path loss values based on the sensing results. The WTRU may process a set of such side link path loss estimates and determine a side link path loss range corresponding to the set of configured range by associating the configured small, medium and long range with an estimated path loss. For example, the WTRU may associate a 33-percentile path loss estimate with the small range, 67-percentile path loss with the medium range and 100-percentile with the large range. The WTRU may determine a side link power based on the side link path loss estimate associated with the configured range. To enable the path loss estimate, a WTRU may indicate transmit power in the SCI information.

A WTRU may be configured with a set of transmission characteristics to associate to each value of range parameter received from the upper layers. For example, the range parameter value from the upper layers may take on a set of predefined values (1, 2, . . . N). For each value of the parameter, the WTRU may be configured to assign a desired N-tuple of transmission parameters, where each element in the N-tuple consists of one of the above-mentioned transmission parameters, such as N-tuple, number of retransmissions, TX power, selected MCS, and beamforming angle. The WTRU may be configured with a table mapping of range parameter to a distinct N-tuple. A WTRU may further be allowed to perform selection of any or a subset of possible values for one of the N-tuples. For example, the WTRU may have no preference for TX power or it may be or selectable by the WTRU. Beam angle may be a selection from a subset of allowable/supported beam angles for a certain range parameter value.

A WTRU may be configured with the set of applicable transmission parameters by means of a transmission profile. The transmission profile may consist of a set of transmission parameters to be applied to a transmission on sidelink. The WTRU may select, based on characteristics of the data to be transmitted, such as its transmission range and/or QoS characteristics (e.g., priority or reliability) associated with the data, to perform transmission using an associated transmission profile configured for that transmission range and/or QoS characteristic. The WTRU may use a first transmission profile for transmission of packet having a first range characteristic, and it may select a second transmission profile for transmission of a packet having a second range characteristic.

A transmission profile may be configured by the gNB (e.g., through RRC signaling), it may be preconfigured, or it may be hardcoded in the WTRU by specification. The WTRU may further support a subset of hardcoded and defined transmission profiles and may indicate the supported transmission profiles to the gNB and/or upper layers.

The transmission profile may influence one or more of the following WTRU transmission parameters. The transmission profile may dictate retransmissions on PSCCH and/or PSSCH. For example, a transmission profile may be associated with a number of retransmissions (e.g., of SCI) to be applied on PSCCH and/or PSSCH. The transmission profile may also dictate the time/frequency relationship between transmissions and retransmissions. For example, the time between transmission and retransmission may be fixed and determined by the transmission profile. The channel (or frequency location) of the retransmission may have a relationship to the frequency resource used by the initial transmission, where that relationship may be determined from the transmission profile.

The transmission profile may influence the selected resource pool. For example, a transmission profile may restrict or dictate the resource pools that can be used for transmission of data via sidelink.

The transmission profile may influence the use of TX diversity. For example, a transmission profile may indicate whether TX diversity (e.g., space diversity) should be applied to transmission of the data A transmission profile may further configure the settings of diversity transmission (e.g., through hopping of resources) by configuring the hoping pattern across slots, beams, resources, BWPs, and TX pools.

The transmission profile may influence the TX Power on PSCCH and/or PSSCH. The transmission profile may determine the nominal or maximum transmission power to be used. It may also indicate the amount by which the transmission power can be increased/decreased with each initial transmission/retransmission and/or successful transmission/retransmission.

The transmission profile may influence the selected MCS for transmission.

The transmission profile may influence beamforming characteristics. The transmission profile may determine or influence the beamforming characteristics for transmission. The characteristics may include whether to perform omni-direction transmission or transmission over only a subset of beams. whether to turn on/off beam sweeping, and the beam angle or set of beams to use. The set of beams may reference a specific reference direction, such as the direction of travel of a vehicle or some fixed direction (e.g., north).

The transmission profile may influence enabling/disabling relaying. The transmission profile may indicate whether a transmission should be transmitted to a relay or not. A WTRU, based on the transmission profile, may further indicate within the transmission (e.g., as a control element in the PDU of one of the AS layers such as MAC, RLC, PDCP) whether or not a specific message should be relayed, and with how many hops.

The transmission profile may influence sidelink transmission mode. The sidelink transmission mode may determine whether the WTRU employs PC5 transmission or Uu transmission, whether the WTRU uses mode 3 or mode 4 for the transmission, and/or whether the WTRU selects resources that allow sharing between gNB scheduled and WTRU autonomous or resources that are not shared.

The transmission profile may influence the bandwidth and carrier frequency to use (e.g., indication of the bandwidth part or carrier). For example, the transmission profile may indicate the BWP to be utilized for the transmission.

The transmission profile may influence the control channel and/or data channel format, (i.e., slot/mini slot format) and set of OFDM symbols to use in time/frequency. For example, the WTRU may be configured to transmit SCI or data using different PSCCH or PSSCH formats. The profile may further determine which of the allowable control channel formats to use for PSCCH and/or PSSCH.

The transmission profile may influence resource selection criteria for one-shot or periodic resources. A transmission profile may influence one or more criteria of the mode 4 (WTRU autonomous) resource selection criteria. For example, each transmission profile may be associated with a different RSRP/RSSI/CBR or similar threshold to determine whether a resource is occupied by another WTRU transmission or is available for selection. Each transmission profile may be associated with a different criteria (e.g., maximum number of consecutive resources to be reserved or criteria for reselection of resources) for reserving or maintaining the selected resources.

A WTRU may be configured with multiple transmission profiles and be configured to use different transmission profiles depending on the area. More specifically, the WTRU may determine its current geographical location, and apply the configured transmission profile for that geographical location.

The V2X application layer, or any of the upper layers as described herein, at the WTRU may be aware of the transmission profiles supported or configured at a given time, and may select a transmission profile for transmission of a V2X message when it sends the message for transmission by the AS layer. The application layer may provide an index to the selected transmission profile. For example, each transmission profile may be associated with a different range index, and the application layer may pass a range index to the lower layer along with the packet to be transmitted.

The WTRU AS may be configured with a set of transmission profiles (e.g., PF1, PF2, . . . PFN). The WTRU may further be configured by the gNB with a mapping of range parameter (e.g., short, medium, long, or range1, range2, . . . range n) to profiles. The configuration may be provided to the WTRU by RRC signaling, by MAC CE, via SI, or by preconfiguration. When the application layer selects a specific range value to be used with a packet, the WTRU AS may then select one of the configured transmission profiles associated with that range value.

A WTRU may receive an association between a destination address, carrier frequency, or similar parameter identifying the destination of the V2X message, and the range over which to transmit the message. The association may be in the form of a mapping between one or multiple destination addresses and/or carrier frequencies and/or bandwidth parts and a range value. The range value may be in any form described herein (e.g., short, medium, long, directional information, etc.). The mapping may be provided through configuration (e.g., pre-configuration or gNB/eNB configuration) or may be provided by upper layer configuration. The mapping may also be altered by an updated configuration. The WTRU may apply a certain transmission parameter or set of transmission parameters during transmission of a V2X packet with the specific destination address at any time based on the mapping of destination address to range mapping.

The WTRU may maintain the mapping of destination address to range (e.g., short, medium, long) received by the gNB by RRC signaling. The WTRU may maintain such mapping until it receives a new mapping upon reception of a new RRC configuration. The WTRU may also apply or assume a default range (e.g., long range) for any destination addresses received from upper layers which have not been configured with a corresponding range value. Upon reception of a packet with a given destination address, the WTRU may apply a transmission parameter that meets the associated range characteristics. The determination may be further based on a transmission profile, as described herein.

A WTRU may be configured with and maintain an association between a destination address, carrier frequency, or similar parameter identifying the destination of the V2X message and a transmission profile. The WTRU may receive this configuration from the gNB/eNB, from the upper layers, and/or in preconfiguration. Upon reception of a packet with a given destination address, the WTRU may apply the associated configured transmission profile in order to transmit the packet.

The WTRU may have a two stage mapping from destination address to transmission profile to set of transmission parameters. Each stage of the mapping may be configured/reconfigured by different entities/mechanisms or at different times. The WTRU may be configured by gNB/eNB and/or pre-configuration with a mapping of profile numbers/indices to transmission parameter sets. The transmission parameter sets may consist of the setting of any of the parameters associated with the transmission profile. The WTRU may then receive a mapping from the application layer of destination address to transmission profile, such as in the form of an index in a set of known transmission profiles (e.g., PF1, PF2, PF3, etc). For example, destination address x may use transmission profile PF1.

A WTRU may provide a mapping of destination address to range index and/or transmission profile to the gNB. The mapping may allow the gNB to perform appropriate scheduling decisions for mode 3 type operation (i.e., gNB scheduled). For example, a WTRU may provide a list of destination addresses to the gNB in an RRC message similar to the UESidelinkInformation message. The message may contain range information associated with each of the destination addresses. The WTRU may provide the range index associated with each destination address, as provided by the application layer in the WTRU. The WTRU may provide the mapping of destination address to range index to the gNB at one or more of the following events.

The WTRU may provide the mapping of destination to range index at a change of the mapping initiated by the WTRU's application layer, possibly as a result of receiving new mapping information from the V2X control function or any other network function in the core network.

The WTRU may provide the mapping of destination to range index at a transition by the WTRU to RRC_CONNECTED, possibly if the mapping was changed while the WTRU was operating in RRC_IDLE/RRC_INACTIVE.

The WTRU may provide the mapping of destination to range index at handover for the case of a WTRU performing sidelink transmission while in RRC_CONNECTED.

Further the WTRU may provide the mapping of destination to range index at a RAN area update or tracking area update, during selection of a new PLMN by the WTRU (i.e., change of PLMN), and when the WTRU changes the geographic area that may be preconfigured in the WTRU.

A WTRU may assign a distinct set of logical channels to packets with a specific range parameter value. For example, logical channel IDs L1-L2 may be used for packets marked as "short range," logical channel IDs L3-L4 may be used for packets marked as "medium range," and logical channel IDs L5-L6 may be used for packets marked as "long range." The WTRU may select the specific logical channel ID within the allowable set for a specific range value based on other QoS-related factors (e.g., priority). Namely, the WTRU may select the logical channel ID with the smallest value within the set for "medium range" for a high priority packet to be set over medium range. The allowable sets may also be configured by the network or may be preconfigured in the WTRU.

A WTRU may mark an SDU with a specific range identifier value at the AS based on the range parameter value. The range identifier value to range parameter value mapping may also be configurable. The WTRU may not restrict a packet with a specific range identifier value to use a specific logical channel. Instead, the WTRU may take into account the range parameter value/identifier in the L2 processing at PDCP, RLC, and MAC layers. For example, during segmentation of an SDU, a WTRU may associate the specific range identifier value or range parameter value to each of the segments of the SDU.

A WTRU may perform concatenation/multiplexing of SDUs at any layer (e.g., RLC and/or MAC) such that two packets with different range parameter value are never concatenated/multiplexed. Alternatively, the WTRU may perform multiplexing between different logical channels such that the logical channel set associated with different range parameters are never multiplexed together.

A WTRU may perform selective concatenation/multiplexing of packets and/or logical channels depending on the range parameter itself. For range parameter x, multiplexing may be allowed, while for range parameter y, multiplexing may not be allowed. For a range parameter value associated with transmission direction, the WTRU may perform concatenation/multiplexing. For a range parameter associated to TX power, the WTRU may not perform concatenation/multiplexing. These rules may be specified or configured to the WTRU by RRC or preconfiguration. A WTRU may further select a resource/grant for a PDU that is identified to be restricted with a specific range based on a range associated with that PDU. The range may be the worst case range.

A WTRU may determine the transmission parameters to be used for a MAC PDU that contains logical channels or packets having different range parameter values. The determination may be based on specific rules depending on the range parameter value. More specifically, when the WTRU receives multiple range parameters for a given packet, the WTRU may be configured with a specific behavior for each range parameter. The WTRU may be configured to use a combination/sum. For example, if packets associated with different transmission directions are multiplexed, the MAC PDU may be transmitted in each of the directions associated with the different range parameter values in that packet. The WTRU may be configured to use maximum transmit power. For example, if packets associated with different TX power are multiplexed in a MAC PDU, the MAC PDU may be transmitted with the maximum TX power associated with any of the parameter values provided in the packet.

The WTRU may be configured to use a minimum beam angle. For example, if packets associated with different beam angle are multiplexed in a MAC PDU, the MAC PDU may be transmitted with the minimum beam angle associated with any of the parameter values provided in the packet. The WTRU may be configured to use an average value of the above parameters.

A WTRU may also alter the rules associated with parameter selection (e.g., using an average value instead of a maximum value) depending on resource selection criteria. The resource selection criteria may include, but is not limited to currently measured CBR, percentage of current availability of resources or intermediate resource availability from sensing results, and average RSSI of available resources.

A WTRU may include information associated with the range in the sidelink buffer status reports to the gNB. The range information may be provided explicitly. The WTRU may provide an amount of data in the WTRU buffers associated with each range parameter value. For example, for a range parameter that can take on "short," "medium," "long," the WTRU may report an amount of data in the buffer for each of these three values.

A WTRU may provide this information implicitly using mapping, possibly configurable, to the reported logical channel group. For example, a new set of logical channel groups may be reported. Each logical channel group may be associated with one or set of range parameter values. The mapping between range parameter value and logical channel group may further be configurable. For example, a LCG may be mapped to one or more PPPP and one or more range parameter values. The WTRU may report the buffer status associated with each LCG by determining the number of packets in the WTRU buffers associated with the configured PPPP values and range parameter values.

A WTRU may report a single range parameter value to the network for each LCG reported. The single parameter value per LCG may be derived similar to the transmission parameter selection for multiplexed MAC PDUs described above. More specifically, the single parameter value may be a combination, maximum, minimum, or average. For example, the WTRU may determine all the different beam directions of the packets in each of the logical channels associated with an LCG and with data pending in those logical channels. The WTRU may report this set of beam directions along with the buffer status for that LCG. The set of beam directions may be mapped to a specific number (identifier) by configuration or standardized mapping.

Data available at the PHY layer may be marked with a different resource characteristic depending on the range parameter identifier described above. A WTRU may perform independent resource selection procedures for each independent range parameter identifier provided above. Each resource selection procedure may have specific rules dependent on the associated range parameter identifier it is associated with. In addition, the WTRU may perform resource selection for a first value of range parameter first, and a second resource selection for a second value of range parameter second.

A WTRU may perform resource selection for data requiring a given transmit direction differently than another transmit direction. Specifically, the WTRU may only consider certain resources for sensing/resource selection.

Figure 5:
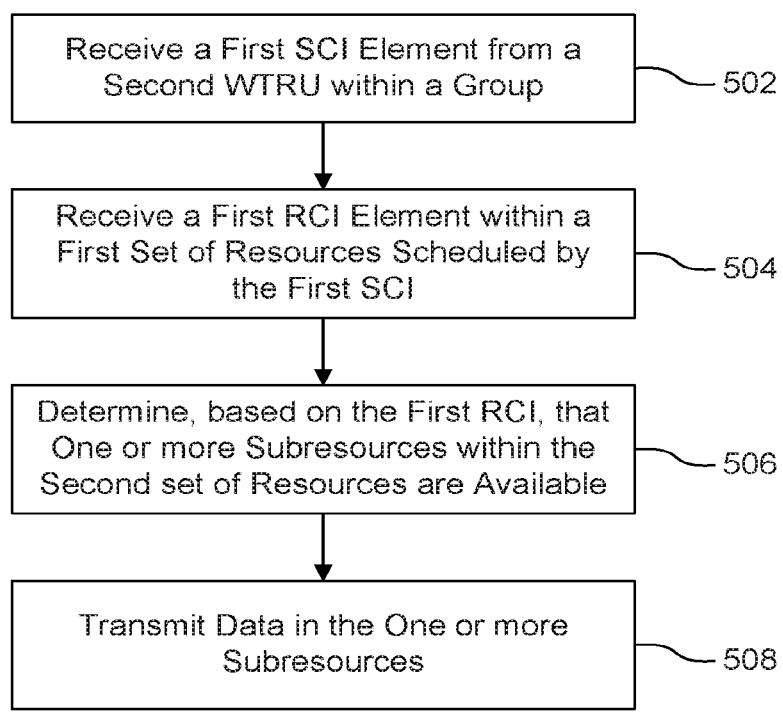
FIG. 5 is a flowchart illustrating the first method of group reservation using subresource coordination.

Referring to FIG. 5, a flowchart illustrating the first method of group reservation using subresource coordination is shown. In step 502, a WTRU may receive a first SCI element from a second WTRU within a group. In step 504, the WTRU may receive a first RCI element within a first set of resources scheduled by the first SCI. The first RCI may include information about which WTRU in the group is scheduled to use a second set of resources. In step 506, the WTRU may determine, based on the first RCI, that one or more subresources within the second set of resources are available. In step 508, the WTRU may transmit data in the one or more subresources.

Although features and elements are described above in one particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) configured for sidelink communication, the WTRU comprising:
 a transceiver; and
 a processor, wherein:
 the transceiver is configured to receive configuration information from a network, wherein the configuration information indicates a range parameter value associated with a quality of service (QoS) flow;
 the processor is configured to receive a data packet for transmission, wherein the data packet has the associated range parameter value;
 the processor is configured to establish a radio bearer for the data packet having the associated range parameter value;
 the processor is further configured to select at least one data transmission parameter based on at least the range parameter value; and
 the transceiver is configured to transmit the data packet based on the selected at least one data transmission parameter.

2. The WTRU of claim 1, wherein the data packet is associated with a QoS.

3. The WTRU of claim 1, wherein the data packet is received from a higher layer.

4. The WTRU of claim 1, wherein the range parameter value corresponds to a physical distance.

5. The WTRU of claim 1, wherein the range parameter value indicates a physical distance over which a QoS of the data packet should be satisfied.

6. The WTRU of claim 1, wherein the at least one data transmission parameter comprises at least one of: a modulation and coding scheme (MCS), a transmission power, or a maximum number of retransmissions.

7. The WTRU of claim 1, wherein the selected at least one data transmission parameter is based on a network configured mapping.

8. The WTRU of claim 1, wherein the selected at least one data transmission parameter is based on a channel busy ratio (CBR) value.

9. The WTRU of claim 1, wherein the selected at least one data transmission parameter is based on a logical channel priority.

10. A method for sidelink communication, implemented by a wireless transmit/receive unit (WTRU), the method comprising:
 receiving configuration information from a network, wherein the configuration information indicates a range parameter value associated with a quality of service (QoS) flow;
 receiving a data packet for transmission, wherein the data packet has the associated range parameter value;
 establishing a radio bearer for the data packet having the associated range parameter value;
 selecting at least one data transmission parameter based on at least the range parameter value; and
 transmitting the data packet based on the selected at least one data transmission parameter.

11. The method of claim 10, wherein the data packet is associated with a QoS.

12. The method of claim 10, wherein the data packet is received from a higher layer.

13. The method of claim 10, wherein the range parameter value corresponds to a physical distance.

14. The method of claim 10, wherein the range parameter value indicates a physical distance over which a QoS of the data packet should be satisfied.

15. The method of claim 10, wherein the at least one data transmission parameter comprises at least one of: a modulation and coding scheme (MCS), a transmission power, or a maximum number of retransmissions.

16. The method of claim 10, wherein the selected at least one data transmission parameter is based on a network configured mapping.

17. The method of claim 10, wherein the selected at least one one data transmission parameter is based on a channel busy ratio CBR value.

18. The method of claim 10, wherein the selected at least one data transmission parameter is based on a logical channel priority.

* * * * *